June 28, 1955　　　R. L. SMIRL　　　2,711,656
TRANSMISSION
Filed Dec. 23, 1948　　　7 Sheets-Sheet 1

Inventor:
Richard L. Smirl
By Edward C. Dietzsch
atty

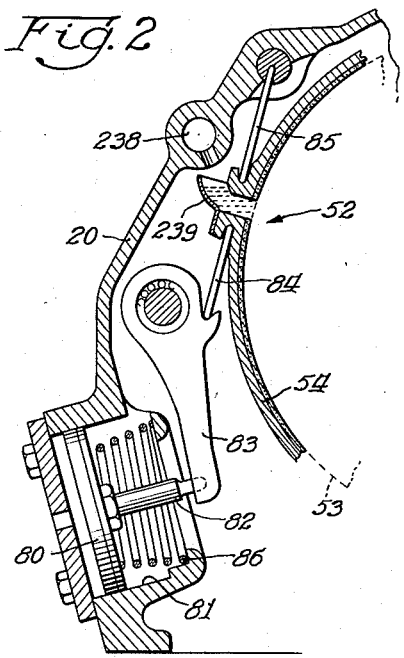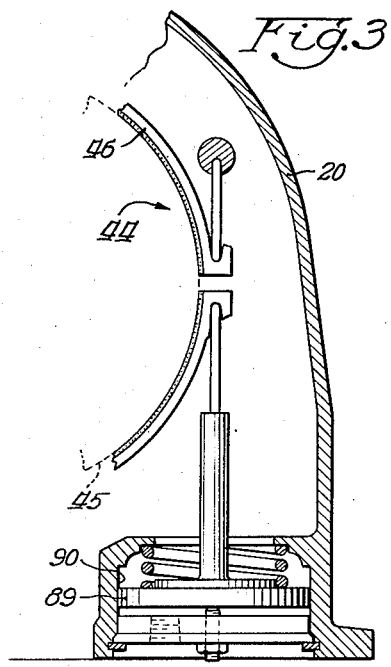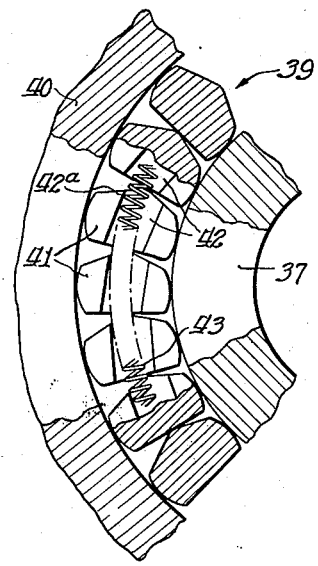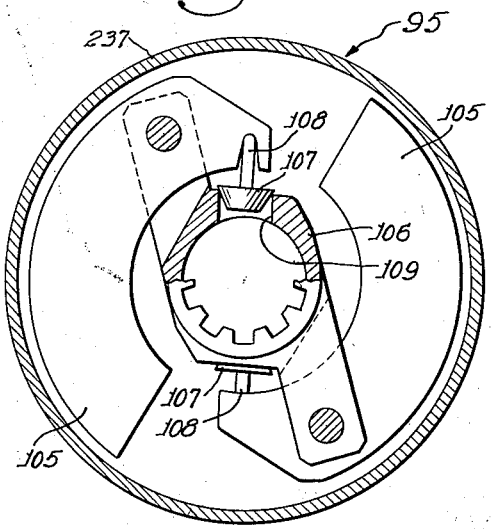

Inventor:
Richard L. Smirl

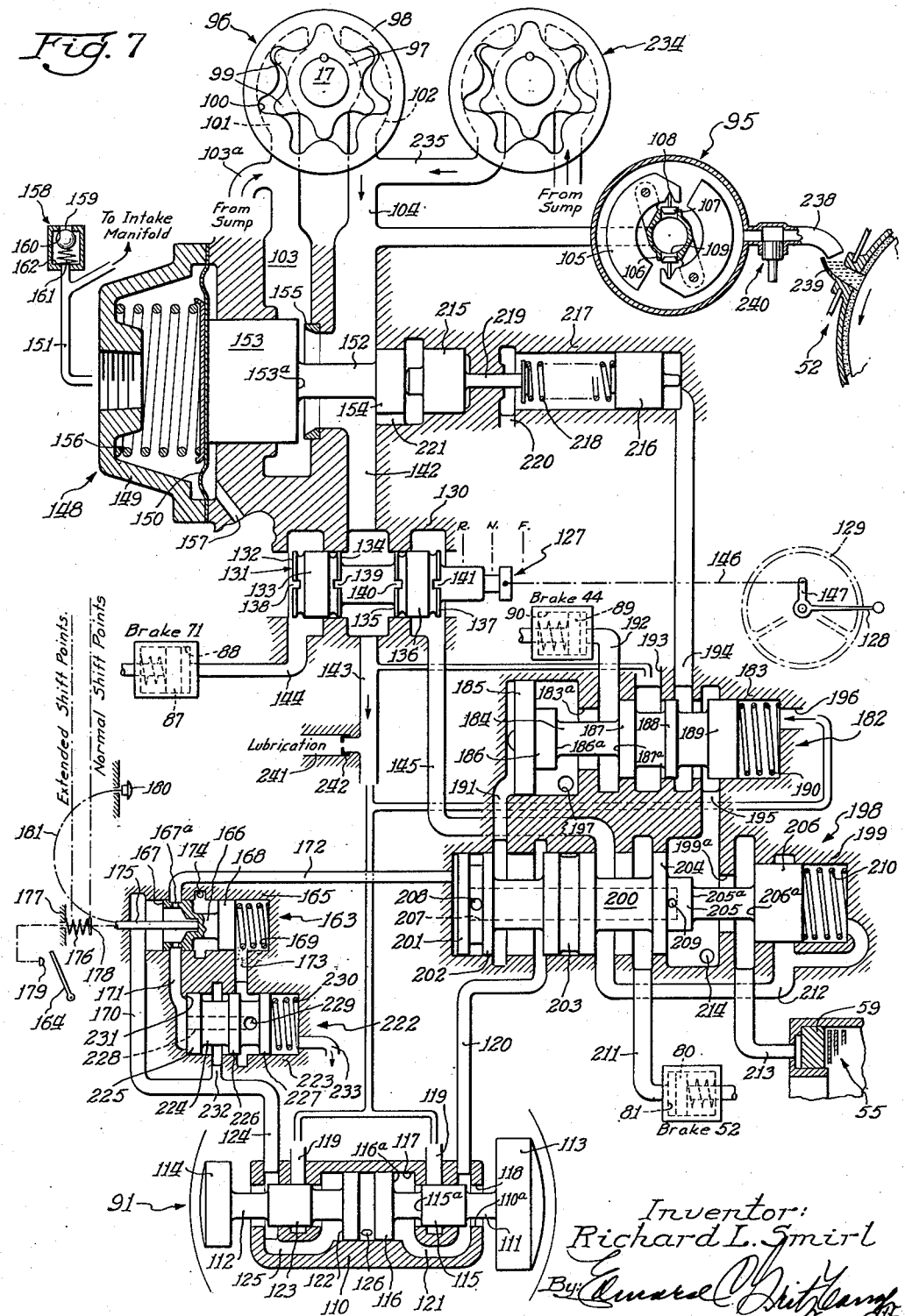

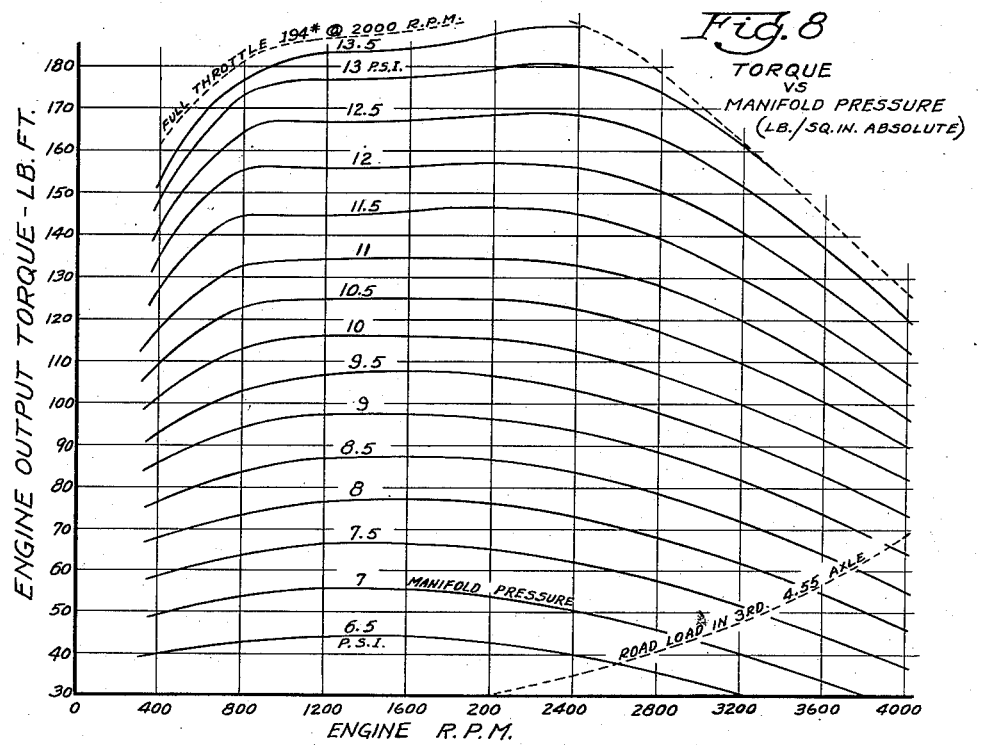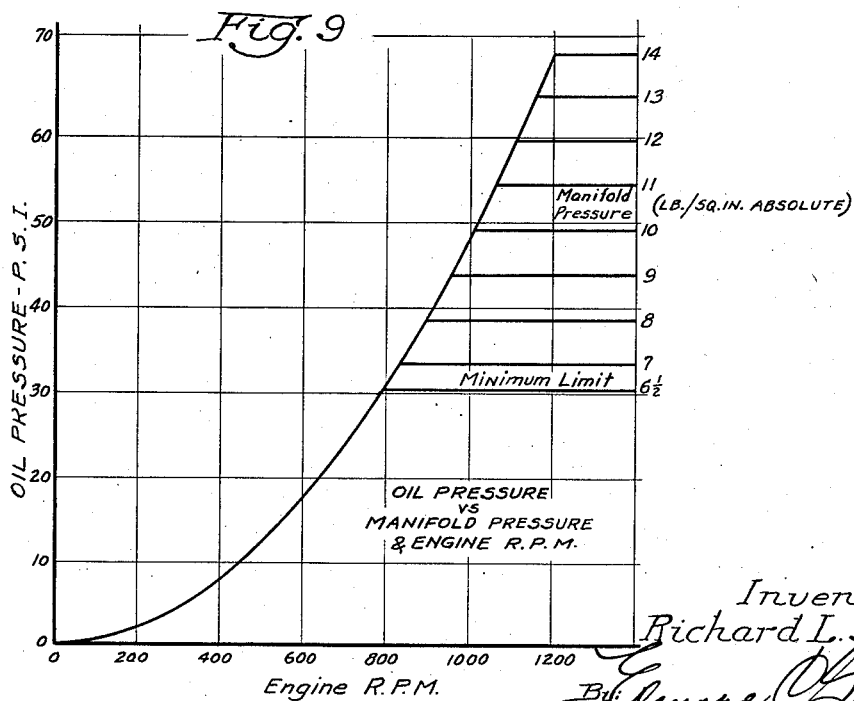

June 28, 1955   R. L. SMIRL   2,711,656
TRANSMISSION
Filed Dec. 23, 1948   7 Sheets-Sheet 6
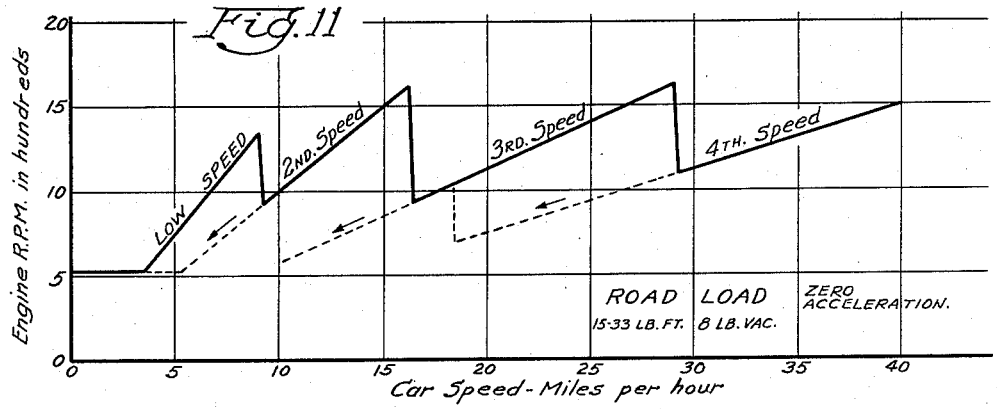
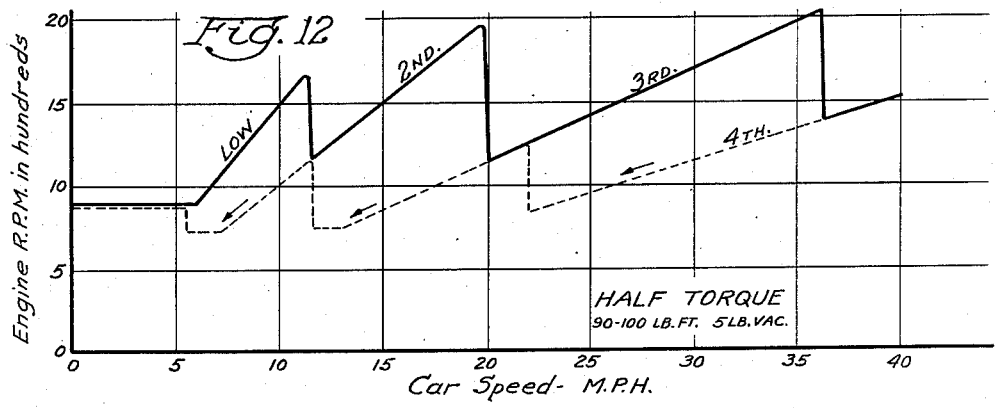
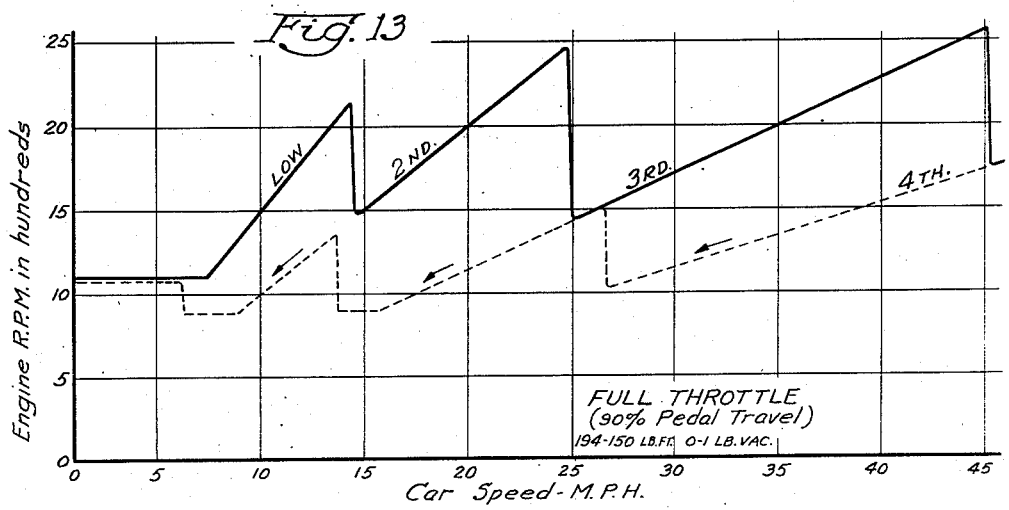
Inventor:
Richard L. Smirl
By: Edward C. Hirtzlaugh
Atty.

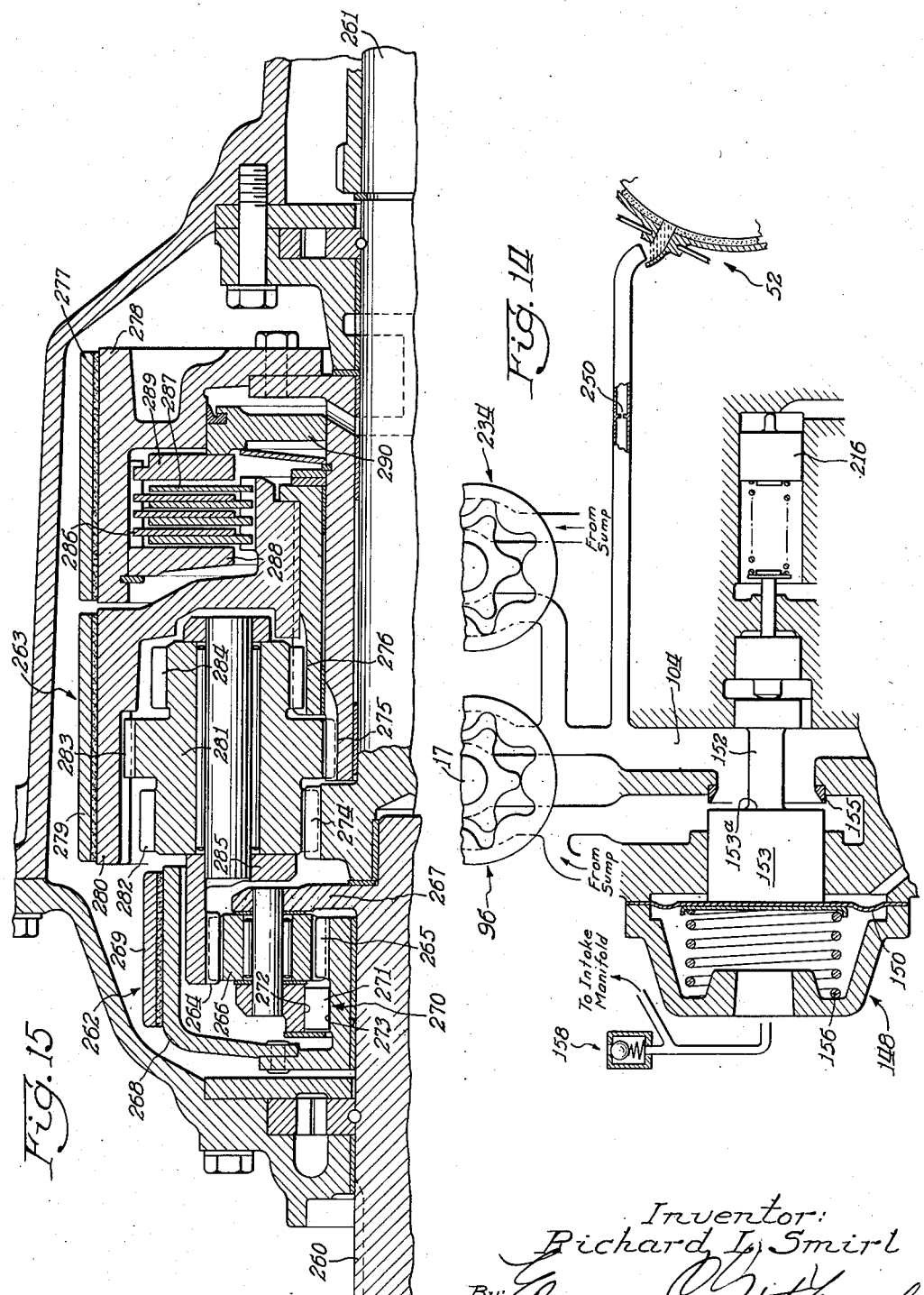

United States Patent Office 2,711,656
Patented June 28, 1955

2,711,656

TRANSMISSION

Richard L. Smirl, La Grange, Ill., assignor to Borg-Warner Corporation, Chicago, Ill., a corporation of Illinois Application December 23, 1948, Serial No. 66,885

59 Claims. (Cl. 74—472)

My invention relates to transmissions and controls therefor which are particularly suited for use in automotive vehicles.

It is an object of my invention to provide an improved transmission gear set which provides four forward speed ratios and at least one speed ratio in reverse drive and which is simple in construction and economical of manufacture.

It is another object of the invention to provide an improved transmission control, and more particularly it is an object to provide an improved control arrangement by means of which the transmission may be started by engagement of a friction brake. It is contemplated that the brake shall be effective on a reaction element of a planetary gear set in the transmission, so that engagement of the brake completes a power train.

It is also an object to control engagement of the brake for starting the vehicle by means of a control arrangement subject to the speed of the drive shaft, and to this end the brake may be engaged by fluid pressure controlled by a centrifugal valve driven by the drive shaft. It is also another object of the invention to alternatively control the engagement of said brake for starting the vehicle by means of a hydraulic orifice which operates to provide an engagement quite similar to the centrifugal mechanism just mentioned.

It is an object of the invention to provide other friction engaging elements for changing the ratio of the transmission from its starting ratio to its higher speed ratios. It is also an object to engage these friction elements by hydraulic pressure and to provide shiftable members, particularly valves, for controlling the friction engaging elements. It is an object to control movement of the valves in accordance with the pressure in the vehicle engine air intake manifold and also in accordance with the speed of the driven shaft so that driven shaft speed and engine torque jointly control change of ratio of the transmission into its higher speed ratios. It is contemplated that the shiftable valves may be acted on by fluid pressure varying with the engine manifold pressure, and the control mechanism for varying the fluid pressure in accordance with engine manifold pressure may be a fluid pressure control valve connected with the engine manifold. The valves in order to be shifted in accordance with driven shaft speed may be acted on by a fluid pressure that varies with this speed, and hydraulic governor means driven in accordance with the driven shaft speed may be utilized for providing this fluid pressure.

It is an object of the invention to provide a common fluid circuit having pressure therein which varies in accordance with the speed of the driving shaft of the transmission at low vehicle speeds and varies in accordance with the output torque of the vehicle engine in the higher driving speeds of the vehicle and which circuit is connected to have the following three functions; to engage the starting friction engaging means of the transmission in accordance with the driving shaft speed in the vehicle starting speed range; to actuate the shiftable valves for the transmission control means in accordance with the engine torque in the driving speed range of the vehicle; and to engage the friction engaging elements operating the transmission above the low speed ratio with a pressure that varies in accordance with the engine torque. It is contemplated that the centrifugal valve and the manifold connected valve just mentioned may be both connected with the common fluid circuit for controlling the pressure therein in this manner.

It is a further object of the invention to provide an improved gear set which comprises two gear sets connected in tandem whereby four forward speed ratios are obtainable, and it is an object to so control these gear sets by a shiftable member, in particular a valve, for each of them. The valves preferably have a fluid pressure that varies with the engine output torque impressed on them for moving them in one direction and have a fluid pressure that varies with the driven shaft speed for urging them in the opposite direction for shifting the transmission either to higher or lower speed ratios as the case may be. The fluid pressure that varies with the driven shaft speed may be two different pressures, each controlled by a different hydraulic governor, and it is an object of the invention to connect one of the governors with one of the valves and the other governor with the other of the valves, with the arrangement being such that the former governor is also connectible to shift the latter valve after two changes in ratio have been made by the valves thereby making a final and third change in ratio.

It is a further object of the invention to control the fluid pressure output of the driven shaft governor in accordance with the accelerator position for decreasing the governor pressure applied to the shiftable valves for changing the driving ratio into the two higher forward speed ratios and for reducing this pressure when the accelerator is moved to a fully opened throttle kickdown position whereby the transmission is downshifted out of its two highest ratios on such movement of the accelerator. It is a further object to provide such valving in connection with the output of this governor so that a change of ratio into the highest of the four speed ratios of the transmission is inhibited when the accelerator is moved to this position.

It is another object of the invention to provide a limiting mechanism for limiting the decrease of fluid pressure which can be caused by a decrease in pressure within the vehicle manifold so that the friction engaging elements in the transmission do not decrease in engagement to a slipping condition when the vehicle accelerator is completely released and the vehicle is descending a hill, for example. It is also an object to provide means for temporarily decreasing the fluid pressure available for engaging the friction engaging elements of the transmission when the valves shift to change the speed ratio of the transmission. It is also an object to provide a valve mechanism under the control of the vehicle operator for selectively overruling the action of the centrifugal valve mechanism for causing the engagement of the friction engaging means for starting the vehicle at a higher engine speed than would otherwise be the case to provide for better operation in cold weather of the vehicle.

It is another object of the invention to so proportion the shiftable valves that they require considerably lower values of driven shaft speed for causing an increase of the transmission ratio than for causing a reduction thereof, assuming that the torque of the vehicle engine is constant. It is also another object of the invention to provide a fluid pump driven by the driven shaft as well as one driven by the drive shaft for providing a source of fluid pressure for operating the transmission, and in this connection it is an object to provide improved pressure regulating means which functions to maintain the pressure constant regardless of the rate of flow from either one or both of these fluid pumps. It is also an object to provide a valve in series with the centrifugal valve mechanism for blocking the output of this mechanism when it is desired to start the engine of the vehicle by pushing or towing the vehicle.

It is a further object of the invention to provide means for cooling the starting friction engaging elements of the transmission by providing grooves in the friction surfaces of the elements and connecting the grooves with a source of fluid. To this end it is an object to so connect these grooves with the output of the centrifugal mechanism so that a substantial flow of fluid through the grooves is obtained when these couplings are normally slipping, when the centrifugal valve mechanism is open.

The invention consists of the novel constructions, arrangements and devices to be hereinafter described and claimed for carrying out the above stated objects and such other objects as will appear from the following description of preferred embodiments of the invention illustrated with reference to the accompanying drawings, wherein:

Fig. 1 is a longitudinal cross sectional view of a transmission embodying the principles of the invention;

Figs. 2 and 3 are sectional views taken on lines 2—2 and 3—3 respectively of Fig. 1;

Figs. 4 and 5 are sectional views on enlarged scales taken respectively on lines 4—4 and 5—5 of Fig. 1;

Fig. 7 is a diagrammatic illustration of the control arrangement that may be used with the transmission illustrated in Fig. 1;

Figs. 8, 9, 10, 11, 12 and 13 are graphs showing various characteristics of the vehicle engine and the control arrangement shown in Fig. 7;

Fig. 14 is a diagrammatic illustration of a portion of a transmission control arrangement constituting a modification of the arrangement shown in Fig. 7; and Fig. 15 is a fragmentary longitudinal sectional view of a modified form of the transmission.

Like characters of reference designate like parts in the several views.

Figure 1:
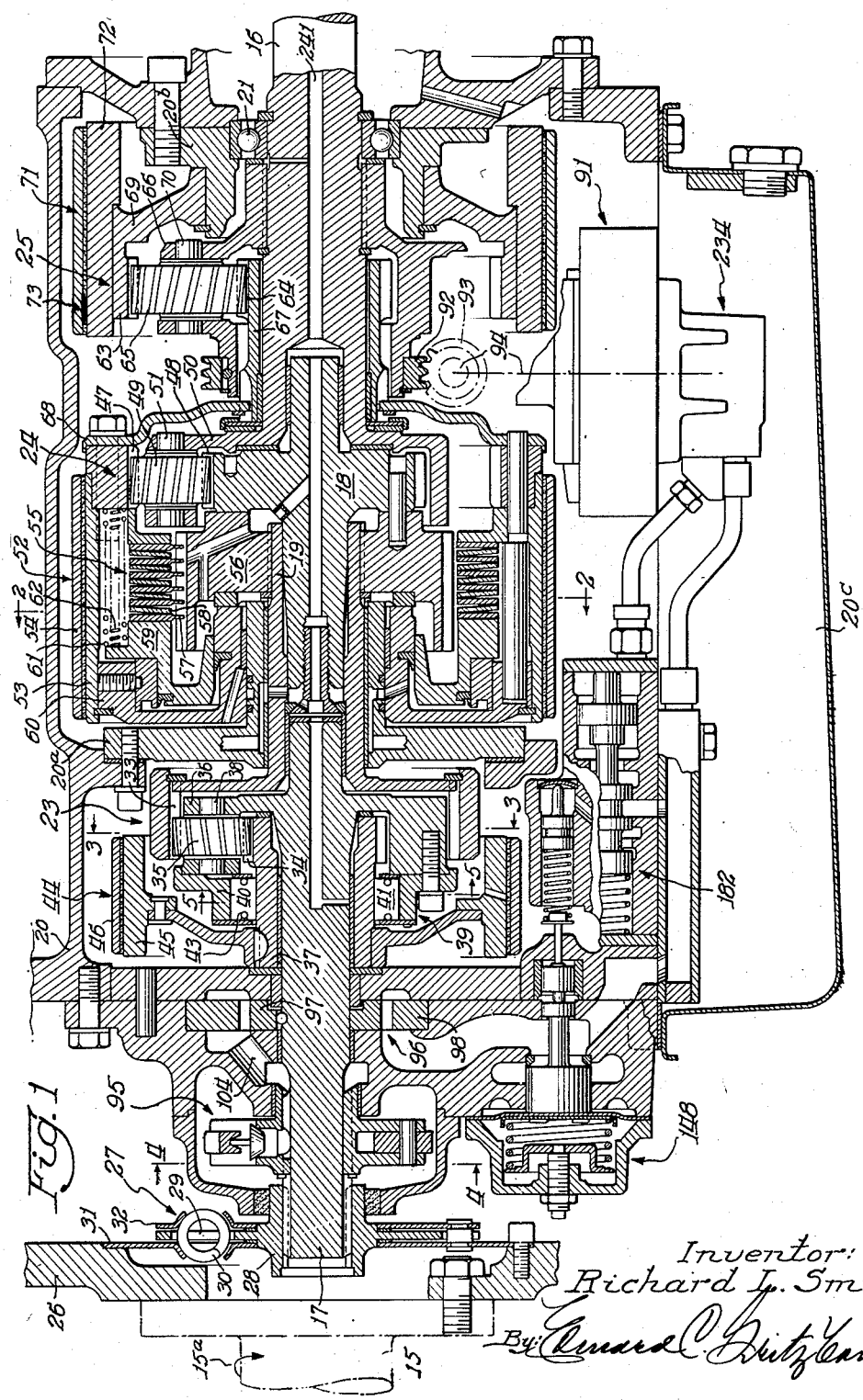

Referring now in particular to Fig. 1, the illustrated transmission comprises a drive shaft 15, a driven shaft 16, an intermediate shaft 17, a second intermediate shaft 18, and a third intermediate shaft 19. The drive shaft 15 is adapted to be connected to the driving engine (not shown) of the vehicle in which the transmission is installed, and the driven shaft 16 is intended to be connected to the road wheels of the vehicle. The driven shaft 16 is journaled within the transmission case 20 by means of a bearing 21, and the intermediate shaft 18 is piloted within the driven shaft 16. The shaft 19 is splined on to the shaft 18, and these shafts are rotatably disposed within the transmission case by means of a case portion 20a. The shaft 17 is piloted within the shaft 19 and is fixed coaxially with respect to the shaft 15 by mechanism hereinafter to be described.

The transmission comprises in general three planetary gear sets 23, 24 and 25. The gear set 23 constitutes an overdrive unit for connecting the shafts 17 and 19, and the gear set 24 constitutes an underdrive unit for connecting the shafts 18 and 16. The gear set 25 is a reverse unit which cooperates with the gear set 24 for driving the shaft 16 in the reverse direction with respect to the shaft 18.

The drive shaft 15 is connected to a fly wheel 26, and the shaft 17 is connected to the fly wheel by means of a spring dampener assembly 27. The dampener assembly is of well-known construction and comprises a hub 28 which is splined on to the shaft 17 and which is provided with slots 29 in which springs 30 are disposed. The fly wheel has fixed thereto two annular elements 31 and 32 having similar slots for receiving the springs 30. The arrangement is such that the torque transmitted through the assembly 27 passes from the elements 31 and 32 through the springs 30 to the hub 28. The springs function to absorb vibrations which would ordinarily be transmitted from the fly wheel to the shaft 17.

The planetary gear set 23 comprises a ring gear 33, a sun gear 34, planet gears 35 (one being shown in the drawing) in mesh with both the ring and sun gears and a planet gear carrier 36. The sun gear 34 is formed on a sleeve shaft 37 rotatably disposed on the shaft 17 as shown. The gear carrier 36 comprises a plurality of stub shafts 38, one for each of the gears 35, and the gears 35 are rotatably disposed on these shafts.

A one-way clutch 39 which may be of any suitable type is provided between the shaft 37 and a portion 40 of the planet gear carrier. The illustrated clutch 39 comprises a plurality of sprags 41 (see Fig. 5) disposed between facing cylindrical surfaces provided on the members 40 and 37. Each of the sprags has end notches 42 therein, and expanding type garter springs 43 bear on edges 42a of the notches 42 in each sprag and tend to turn the sprag to engage the opposite cylindrical surfaces. The arrangement of the sprags is such that the clutch 39 engages to prevent the shaft 37 from rotating ahead of the carrier 36 in the forward direction, the forward direction being assumed to be the same direction of rotation as the shaft 15 is driven by the vehicle engine shown by the arrow 15a.

A friction brake 44 is provided for the shaft 37 and sun gear 34, and this brake comprises a brake drum 45 fixed with respect to the shaft 37 and a brake band 46 adapted to engage the drum 45.

The gear set 24 comprises a ring gear 47, a sun gear 48, planet gears 49 (one being shown in the drawing) in mesh with the sun and ring gears and a planet gear carrier 50 having stub shafts 51 on which the planet gears 49 are mounted. The sun gear 48 is formed integral with the shaft 18, and carrier 50 is integral with the shaft 16 as shown.

A friction brake 52 is provided for the ring gear 47, and the brake comprises a brake drum 53 fixed to the ring gear and a brake band 54 adapted to act on the drum.

A friction clutch 55 is provided for effectively connecting together the sun gear 48 and the ring gear 47. The friction clutch comprises a hub 56 splined onto the shaft 19, clutch discs 57 splined onto the hub 56 and clutch discs 58 disposed between the discs 57 and fixed with respect to the drum 53.

A hydraulic piston 59 is provided for engaging the discs 57 and 58 with each other. The piston 59 is disposed within an annular member 60 which in turn is disposed within the drum 53 and fits on the casing portion 20a. Springs 61 and 62 are provided for retracting the piston into its clutch disengaged position in which it is shown.

The planetary gear set 25 comprises a ring gear 63, a sun gear 64, a plurality of planet gears 65 (one being shown in the drawing) in mesh with the sun and ring gears and a planet gear carrier 66. The sun gear 64 is formed on a sleeve shaft 67 rotatably disposed on the shaft 16, and this shaft is connected by a member 68 with the ring gear 47. The ring gear 63 is formed on a member 69 which is rotatably disposed on a portion 20b of the transmission casing. The planet gear carrier 66 comprises a plurality of stub shafts 70, one for each of the planet gears 65, on which the planet gears are disposed as shown. A brake 71 is provided for the ring gear 63, and this comprises a brake drum 72 fixed on the member 69 and a brake band 73 for engaging the drum.

The hydraulic controlling mechanism for the transmission comprises servomotors for engaging the bands 46, 54, and 73. The servomotors for the bands are similar, and the motor used in connection with the band 54 will be described by way of example. The motor comprises a piston 80 (see Fig. 2) slidably disposed within a cylinder 81 formed in the transmission casing 20. The piston 80 is connected to one end of the band 54 by means of a piston rod 82, a lever 83, and a strut 84. The other end of the band 54 is anchored with respect to the transmission casing 20 by means of another strut 85. A spring 86 is provided for acting between a portion of the transmission casing 20 and the piston 80 for yieldably holding the piston in its brake disengaged position in which it is shown. For engaging the brake band, fluid under pressure is applied within the cylinder 81 behind the piston 80, and movement of the piston 80 is transmitted to the brake band through the rod 82, the lever 83 and the strut 84, as is apparent.

Similar servomotors and similar arrangements of linkage are provided for engaging the bands 46 and 73. Referring to Fig. 7, the piston 87 disposed within a cylinder 88 is shown diagrammatically for engaging the band 73, and, referring to Figs. 3 and 7, the piston 89 slidably disposed within the cylinder 90 is shown for engaging the band 46.

The hydraulic controlling arrangement for the transmission includes also a hydraulic governor 91 which is driven at the speed of the driven shaft 16 through the planet gear carrier 66. The governor 91 is operatively connected with the carrier 66 by means of a gear 92 fixed to the carrier, a gear 93 in mesh with the gear 92 and a shaft 94 connected to the gear 93 and to the governor. The transmission is also controlled by centrifugal valve mechanism 95 driven by the shaft 17 and thereby in accordance with the speed of the drive shaft 15. The hydraulic arrangement includes a pump 96 which is also driven by the shaft 17.

The pump 96 (see Fig. 7) is of a usual design and comprises an inner rotatable member 97 and an outer rotatable member 98. The member 97 is fixed on the shaft 17 and is generally in the shape of a gear and has radially extending lobes 99. The outer member 98 receives the member 97 and has depressions 100 adapted to receive the lobes 99. The member 98 is eccentrically located with respect to the member 97 so that one of the lobes 99 is disposed in one of the depressions 100 but the remainder of the lobes 99 are outside of the depressions 100, and the pumping action is due to the fact that one less lobe is provided than depressions 100. As shown in Fig. 7, the inlet side of the pump is at 101 and the outlet is at 102. The inlet 101 has an inlet conduit 103 and is connected to the sump 20c of the transmission by means of the conduit 103a, and the outlet side of the pump is connected to a conduit 104. The parts to be controlled by fluid pressure generated by the pump 96 are connected with the conduit 104 as will be hereinafter described.

The centrifugal valve mechanism 95 (see Figs. 4 and 7) comprises a pair of centrifugal weights 105 which are pivotally carried by a hub 106. Each of the weights is arranged to act on a valve piston 107 by means of a strut 108. The valve pistons are arranged to form closures for orifices 109 which are connected to the conduit 104.

The hydraulic governor 91 comprises a casing 110 in which are disposed two centrifugal valves 111 and 112. These valves are similar with the exception that a comparatively large weight 113 is provided on the outer end of the valve 111 while a comparatively small weight 114 is provided on the outer end of the valve 112. The valve 111 comprises lands 115 and 116, as shown. The casing 110 is provided with an internal cylindrical portion 117 adapted to receive the land 116 and a smaller cylindrical portion 118 in which the land 115 is disposed. A pressure conduit 119 is provided in the casing 110 and an outlet conduit 120 is provided next to the conduit 119. The casing is also provided with an internal conduit 121 which connects its internal cylindrical portion 117 with the conduit 120, as shown.

Similar conduits and parts are provided for the valve 112 as for the valve 111. The valve 112 has lands 122 and 123 corresponding to the lands 116 and 115, and the pressure conduit 119 is also connected with the casing 110 in proximity to the valve 112. An outlet pressure conduit 124 is provided for the valve 112 which corresponds to the conduit 120, and a conduit 125 is provided for connecting the internal cylindrical portion 117 with the conduit 124. The casing 110 is provided with a discharge orifice 126 between the lands 116 and 122 which is in communication with the sump 20c.

A valve 127 is provided which is adapted to be manually controlled by means of a selector lever 128 located immediately beneath the steering wheel 129 of the vehicle. The valve 127 comprises a casing portion 130 and a valve piston 131. The piston is provided with lands 132, 133, 134, 135, 136, and 137, as shown. The lands 132, 134, 135 and 137 are provided with grooves 138, 139, 140 and 141 respectively therein extending longitudinally and radially of the piston 131. The casing portion 130 has conduits 142, 143, 144 and 145 therein, as shown. The valve 127 is connected to the selector lever 128 by any suitable linkage such as by the link 146 and the lever 147 which is fixed to rotate with the lever 128. The valve 127 has reverse, neutral and forward positions which are indicated, and the lever 128 has corresponding positions.

The transmission control arrangement includes a pressure or more particularly a vacuum responsive valve 148 which comprises a casing portion 149 and a flexible diaphragm 150 fixed in the casing portion. The casing portion 149 is connected to the air intake manifold (not shown) of the internal combustion driving engine of the vehicle, which generally conducts engine fuel as well, by means of a conduit 151, and the pressure in the manifold which is subatmospheric when the particular engine contemplated is in operation is thus effective on the diaphragm 150. A valve piston 152 is slidably disposed in the casing 149 and comprises lands 153 and 154. The land 153 is of larger diameter than the land 154 and is adapted to coact with a seat 155 fixed within the valve casing 149. A compression spring 156 is provided between the diaphragm 150 and valve piston 152, and the valve casing 149, as shown. A fluid exhaust opening 157 is provided in the casing portion in communication with the sump 20c for draining any fluid from one side of the diaphragm 150.

The conduit 103a connecting the pump 96 with the sump 20c is located in close proximity to the pump inlet 101 and between the pump and valve 152. The valve 152 discharges between its land 153 and seat 155 and is connected at this point with the pump inlet 101, as shown by conduit 103. By this arrangement, the engine pump only draws from the sump the difference between its entire intake and the discharge from the pressure regulating valve 152. Excessive foaming of the oil if the entire intake flow to the pump 96 were taken from the sump is thereby avoided. It will be realized that excessive air in the fluid used with the control arrangement will cause a difference in the operation of the various valves, and it is therefore desirable to avoid any excess foaming in the fluid.

A limit valve 158 is provided in connection with the conduit 151. The limit valve comprises a ball 159 held yieldably on a seat 160 by means of a spring 161 which is disposed between the ball and a spring seat 162.

An extra performance valve 163 is provided under the control of the accelerator 164 for the vehicle engine. Although the connections between the vehicle engine and accelerator are not illustrated, it will be understood that the conventional connections are intended to be used. The valve 163 comprises a casing portion 165 and a piston 166 slidably disposed in a cylindrical cavity in the casing portion. The piston 166 comprises lands 167 and 168 and a compression spring 169 acting on the piston 166. The land 167 has openings 167a therethrough, as shown. The casing portion 165 is provided with conduits 170, 171, 172 and 173 and is also provided with a fluid discharge orifice 174 connected with the sump 20c. The accelerator 164 is adapted to move a pin 175 that fits loosely in a cavity in the valve piston 166, and any suitable linkage between the accelerator and pin may be provided. A spring 176 may be provided between a stationary part 177 of the vehicle and an abutment 178 fixed to the pin 175 for yieldably holding the pin in its illustrated position. The linkage connected with the pin 175 is provided with an abutment portion 179 that is contacted by the accelerator 164 when the latter is moved to its extreme open throttle position for thereafter moving the pin 175 to the left (as shown in Fig. 7) against the action of the spring 176. A button 180 located on the vehicle instrument board or at any other readily accessible position may also be provided for actuating the pin 175. This button may be connected by any suitable linkage such as a flexible Bowden wire 181 with the pin 175.

A valve 182 responsive to governor pressure on one end and pressure responsive to torque demand on the other end is provided. The valve comprises a casing portion 183 and a valve piston 184 which is slidably disposed in a cavity within the casing portion. The valve piston comprises lands 185, 186, 187, 188 and 189, as shown. A compression spring 190 is provided on one end for acting on the valve. The casing portion 183 is provided with conduits 191, 192, 193, 194, 195 and 196, as shown, and the casing portion is also provided with a discharge conduit 197 connected with the sump 20c.

A second valve 198 responsive to both governor pressure and torque demand fluid pressure is provided, and this comprises a casing portion 199 and a piston 200. The piston comprises lands 201, 202, 203, 204, 205 and 206 and has a central hollow bore 207 which has outlets 208 and 209 positioned as shown. A compression spring 210 is provided at one end of the piston 200. The casing portion 199 is provided with the conduits 172, 191, 145, 195, 129 and additional conduits 211, 212 and 213. The casing 199 is also provided with a restricted discharge orifice 214 connected to the sump 20c.

Two pressure control pistons 215 and 216 for modifying the action of the diaphragm 150 are provided. These are slidably disposed in a casing portion 217, as shown. The piston 216 acts on a spring 218 which in turn acts on a pin 219, and the pin is adapted to contact and act on the piston 215 which in turn contacts the piston 152. The rear end of the piston 216 is connected with the conduit 194, and the forward end of the piston 216 is vented to the sump 20c by means of a discharge passage 220. The forward end of the piston 215 is connected to the conduit 142 by means of a passage 221.

A second extra performance valve 222 is connected effectively between the governor 112 and the valve 198. This valve comprises a casing portion 223 and a valve piston 224 slidably disposed in a substantially cylindrical cavity within the casing portion. The valve piston 224 has lands 225, 226 and 227, and the piston is provided with a hollow central bore 228 connected by passages 229 with the groove between the lands 226 and 227. The piston 224 is acted on by a spring 230, and a seat 231 is provided in the piston bore in the casing 223 for limiting its movement under action of the spring 230. The valve 222 is connected by a conduit 232 with the conduit 170, and the conduits 171 and 173 are also connected with the valve, as shown. A discharge conduit 233 is provided which is connected to the sump 20c.

A pump 234, similar to the pump 96, is provided to be driven by the same driving mechanism, including the shaft 94, as the governor 91. This pump is connected by a conduit 235 with the conduit 104, so that it may supply fluid under pressure due to rotation of the driven shaft 16 to the same devices as does the pump 96. The pump 234 is also connected with the sump 20c as shown.

Figure 6:
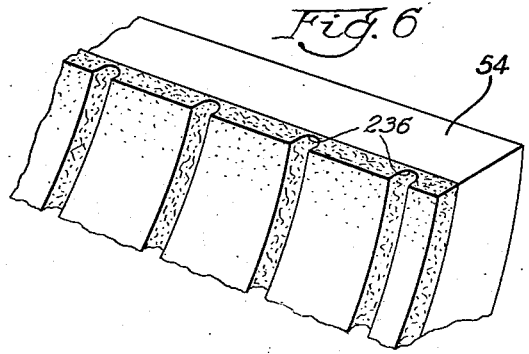
Fig. 6 is a perspective view of a portion of one of the brake bands in the transmission.

The brake band 54 is provided with a plurality of circumferential grooves 236 on its inner surface (see Fig. 6). This surface of the band is lubricated from the discharge from the valves 107, which flows into the grooves 236 as will now be described. There is a casing 237 about the valves adapted to receive the fluid discharged through them, and this casing is connected by a conduit 238 with a trough 239 which is in communication with these grooves. A valve 240 is provided for controlling the flow of fluid through the conduit 238 for purposes hereinafter to be described.

The clutch piston 59 is connected to the valve 198 by means of the conduit 213, and the piston 80 for the brake 52 is connected with this valve by means of the conduit 211. The piston 89 for the brake 44 is connected with the valve 182 by means of the conduit 192, and the piston 87 for the brake 71 is connected by means of the conduit 144 with the valve 127. A lubrication conduit 241 which passes through the shafts 17, 18 and 16 of the transmission is connected with the pressure conduit 143, and an orifice 242 for limiting the fluid flow into the lubrication conduit 241 is provided. The pressure conduit 143 is also connected with the conduits 196, 119 and 193, as shown.

The illustrated transmission provides four forward speed ratios and a reverse drive. Low speed forward drive is provided when the brake 52 is engaged. In this case, the drive is from the drive shaft 15 through the fly-wheel 26, the dampener 27, the shaft 17, the planet gear carrier 36, the ring gear 33, the shafts 19 and 18 and the planetary gear set 24 to the driven shaft 16. The brake 52 is effective to hold the ring gear 47 of the planetary gear set 24 stationary to render this gear a reaction element, and the gear set is effective to drive the driven shaft 16 at a lower speed but at an increased torque with respect to the shaft 18. The planetary gear set 23 is locked up by means of the clutch 39, and all of its parts rotate as a unit so that the shafts 17 and 19 are in direct drive.

Second speed forward drive is thereafter obtained by engaging the brake 44. The brake functions to hold the sun gear 34 of the gear set 23 stationary so that the gear set is effective to drive the shaft 19 at an overdrive with respect to the shaft 17; otherwise the power train is the same as in low speed forward drive.

Third speed forward drive is obtained by disengaging the brakes 44 and 52 and engaging the clutch 55. The drive in this case is from the drive shaft 15, through the fly wheel 26, intermediate shaft 17, the planetary gear set 23, the shaft 19 and the planetary gear set 24 to the driven shaft 16. With the clutch 55 engaged, the parts of the planetary gear set 24 rotate together and the gear set is locked up. The planetary gear set 23 operates in the same condition as in low speed forward drive with the clutch 39 causing the parts of the gear set to rotate together as a unit. The drive through the transmission in this speed ratio is thus a direct drive.

Fourth speed forward drive is obtained by engaging brake 44 with the clutch 55 remaining engaged. The drive is the same as third speed drive with the exception that the gear set 23 is effective to drive its output shaft 19 at an overdrive with respect to its input shaft 17 so that the drive through the transmission as a whole is an overdrive.

Reverse drive is obtained by engaging the brake 71. The drive proceeds as in low speed forward drive through the gear set 23 with the parts of the gear set 23 rotating as a unit and thence from the shafts 19 and 18 and the sun gear 48 through the gear set 24. The ring gear 47 is connected with the sun gear 64 and the carrier 66 of the gear set 25 is connected with the driven shaft 16 all as above described, and the action of the gear set 25 on the gear set 24 is such as to cause the planet gear carrier 50 and thereby the driven shaft 16 to rotate at a reverse underdrive.

Fluid pressure for operating the hydraulic controls shown in Fig. 7 may be derived from the pump 96 which is driven from the shaft 17. The shaft 17 rotates with the driving engine of the vehicle, and hence there is fluid pressure available at all times when the engine is in operation. The pump 96 is of a standard design, the principle of operation of which is well-known; however, its operating principle may be stated in brief as follows:

The shaft 17 drives the inner member 97 having the lobes 99 thereon. The lobes 99 mesh with the grooves 100 to rotate the outer member 96 in the same direction. In view of the fact that there is one fewer lobe 99 than groove 100, there is always a space between the inner member 97 and the outer member 98, as shown, at the lower side of the shaft 17 and inner member 97. The lobes furthermore are of such a shape as to always be in contact with the inner surface of the outer member 98 and hence there exists a suction at the inlet side of the pump 96 and a pressure at the outlet side 102 of the pump. The pressure conduit 104 being connected with the pressure side of the pump 96 thus always has fluid under pressure therein when the vehicle engine is operative.

The fluid pressure within the conduit 104 is regulated by the centrifugal valve mechanism 95 and the pressure responsive valve 152. The centrifugal valve mechanism 95 is responsive to the speed of the intermediate shaft 17 and thereby the drive shaft 15, and the valve 152 is responsive to the torque exerted by the vehicle engine. Both of these valve mechanisms function to by-pass fluid back to the transmission sump 20c in performing their regulating functions as described below.

The weights 105 of the centrifugal valve mechanism 95 rotate with and are driven by the shaft 17. Through the struts 108, the weights 105 act on the valve plungers 107 to urge them into closing relation with their seats 109 so as to inhibit the escape of fluid between the plungers and seats and thereby to increase the pressure of the fluid in the conduit 104. When the valve plungers 107 are not closed against their seats 109 the escaping fluid first serves to cool and lubricate the brake band 54 of the brake 52 and thence proceeds to the sump 20c.

The valve 152 functions to by-pass fluid from the conduit 104 back to the pump inlet 101, which communicates directly with the sump 20c, between its land 153 and the seat 155 and through the conduit 103 when the valve is opened such as is shown in Fig. 7. The position of the valve 152 is regulated by the diaphragm 150 which, as has been described, has the pressure in the vehicle engine manifold impressed thereon, which is a vacuum for the ordinary gasoline internal combustion engine in use in passenger automobiles. When the vacuum in the manifold is greater or in other words, the manifold absolute pressure is less, the vacuum holds the diaphragm 150 and thereby the valve piston 152 against the action of the spring 156 in positions as seen in Fig. 7 with the valve separated from its seat 155. This has the effect of decreasing the fluid pressure in the conduit 104. Similarly a decrease in vacuum or an increase in absolute pressure in the manifold of the vehicle engine allows the spring 156 to move the valve piston 152 to the right as seen in Fig. 7 so that the valve piston tends to be closer to the seat 155 whereby a greater pressure in the passage 104 is needed to move the valve 152 off its seat to allow the pump pressure to escape, and the pressure of the fluid within the passage 104 is thereby increased.

The limit valve 158 functions to prohibit less than a certain degree of subatmospheric pressure from being exerted on the diaphragm 150. When the pressure in the manifold and thereby in the conduit 151 decreases below this limit, the ball 159 moves away from its seat 160 against the action of the spring 161 and admits air into the conduit.

The chart in Fig. 8 shows, with respect to the speed and the output torque of a certain internal combustion vehicle engine, how the manifold pressure of the engine varies. This is the pressure which is exerted on the diaphragm 150, as has been described. It will be apparent from the chart that the manifold pressure varies directly with the torque output of the engine, that is, the manifold pressure increases with an increase of engine torque, and this is generally true of all internal combustion vehicle engines. I wish it to be understood that the data given in this and other charts to be referred to, which are drawn with respect to certain engines and hydraulic installations, are not to be considered as limiting any invention in any manner to the material disclosed in these charts, as they are intended to be illustrative only for the purpose of better describing the invention.

Referring to Fig. 9, the combined effect of the centrifugal valve mechanism 95 and the valve 152 on the fluid pressure in the conduit 104 will be apparent. Referring to this figure, as the engine speed increases, the fluid pressure also increases along the illustrated curve which begins at zero "oil pressure." At higher values of manifold pressure, the fluid pressure increases to higher values, while as the manifold pressure decreases, the upper limit to which the fluid pressure in the conduit 104 increases is less. This is to be expected since, as has been described, decreased absolute pressures on the diaphragm 150 pull the valve 152 farther from its seat. As will be hereinafter made apparent, the centrifugal valve mechanism 95 controls the fluid pressure in the conduit 104 in the starting speed range of the vehicle, and the valve 152, which is controlled in accordance with manifold pressure and thereby in accordance with engine torque output, controls the fluid pressure in the running speed ranges of the vehicle in which the centrifugal valve mechanism is closed.

The pressure regulating valve 152 functions to maintain the fluid within the conduit 104 substantially constant, assuming the centrifugal valve mechanism 95 is closed and there is a constant pressure within the vehicle engine manifold, regardless of the rate of discharge of the pump 96. This action of the pressure regulating valve 152 is due to the fact that its face 153a overlies the seat 155, and fluid escaping between the valve face 153a and the seat 155 has the effect of forcing the valve to the left as seen in Fig. 7. Back pressure which tends to build up in the return passage 103 causes a consequent increase in the upstream pressure adjacent the enlarged face 153a of the valve 152. This increased pressure on the enlarged valve face provides a larger pressure-area force tending to move the valve 152 to the left so that the increased pressure acting on the excess area assists in moving the valve farther open. Any back pressure that develops in the return passage 103 assists in opening the valve farther, that is moving it to the left as seen in the figure, and this is due to the construction in which the diameter of the valve is slightly larger than the valve seat. Greater exhaust from the pressure regulating valve or else a thicker fluid, and the fluid may become thicker at colder temperatures, tends to create pressure in the bypass passage 103 which operates on the overhung annular edge of the valve and helps to lift it.

The transmission mechanism is conditioned for a drive either in forward or reverse by shifting the valve 127 to its forward or reverse position. The valve, as shown in Fig. 7, is in its neutral position. The selector lever 128 positioned beneath the steering wheel 129 is utilized for shifting the valve 127.

Assuming that the valve 127 is moved to the right, as seen in the drawing, to its forward drive position, the conduits 142 and 145 are thereby connected by the groove between the lands 135 and 134. The purpose of the longitudinal grooves or slots 138, 139, 140 and 141 will be hereinafter described. The fluid in the conduit 145 flows between the lands 203 and 204 of the valve piston 200 to the conduit 211 connected to the piston 80 of the fluid pressure motor for the brake 52, and the brake is thereby conditioned for engagement. Brake engagement for completing the low speed forward drive power train through the transmission does not actually take place until the accelerator 164 is depressed to open the vehicle throttle and increase the engine speed above its idling speed for causing the valve mechanism 95 to close, but upon such increase of vehicle speed, closure or partial closure of the valve 107 on their seats 109 causes an increase of fluid pressure in the conduit 104 and the connected conduits to engage the brake 52. With the engine idling, the pressure developed at the centrifugal valve mechanism 95 will be only sufficient to overcome the band return spring 86 and thereby create a slight drag by the brake band 54 on the drum 53. As the throttle is opened, the centrifugal valve mechanism 95 closes and the pressure increases in conduits 104, 142 and 145 while the vehicle accelerates to a corresponding speed, at which time the pressure becomes high enough to prevent slip of the band 54 relative to the drum 23. Above the starting speeds of the vehicle the fluid pressure in the conduit 142 and connected conduits varies substantially exclusively with the engine torque, since the centrifugal valve mechanism 95 is closed, and this torque variable fluid pressure is utilized to keep the band 54 engaged with a pressure that varies with engine torque.

This pressure from the conduit 104 is also utilized for determining the shift points of the transmission mechanism, that is, the points relative to the vehicle speed and engine torque at which increases and decreases in ratio occur. The centrifugal valve mechanism 95 is substantially completely closed at the vehicle speeds at which decreases in ratio occur, and hence the pressure in the conduit 145 at this time varies substantially exclusively with engine torque. For this purpose the fluid in the conduit 145 is applied to the right hand end of the valve piston 200 through said conduits, and the pressure in the conduit 104 is similarly applied to the right hand end of the valve piston 184 through the conduits 142, 143 and 196. It will be apparent from an inspection of Fig. 7 that the grooves between the lands 135 and 134 is sufficiently wide to maintain the conduits 142 and 143 in communication with each other regardless of the position to which the selector valve 127 is moved.

The fluid pressure under the control of the pressure responsive valve 152 is applied to the right hand ends of the shift valves 184 and 200, as has been described, and fluid pressure which varies with the speed of the driven shaft 16 is applied to the left hand ends of these valves as will now be described. The pressure variable with the speed of the driven shaft is supplied by the governors 111 and 112.

The fluid under pressure from the conduits 104 and 143 is supplied to the governor mechanism through the conduits 119 which are connected with the conduit 143. The outlet conduits of the governor valve mechanism are the conduits 120 and 124 which are connected respectively with the governor valves 111 and 112. The governor valve 111 constitutes a low speed governor and has a larger head 113 than the governor valve 112 which constitutes a high speed governor. The casing 110 of the valve mechanism 91 is connected and thereby driven through the shaft 94 and gears 92 and 93 which are driven by the carrier 66 and shaft 16, as has been described, and the casing 110 thus rotates proportionately to the speed of the driven shaft 16. On rotation of the governor casing 110, the governor valves 111 and 112 tend to move outwardly under the action of centrifugal force particularly on their heads 113 and 114. Referring particularly to the valve piston 111, when it moves outwardly, its land 115 will close the exhaust orifice 110a of the valve, which incidentally drains into the sump 20c and will open the conduits 121 and 120 to the pressure conduit 119. Fluid under pressure will thereby be admitted to the conduits 120 and 121 and will act on the ends 116a and 115a of the lands 116 and 115. In view of the fact that the surface 116a has a greater area than the surface 115a, the pressure of fluid in the conduits 121 and 120 tends to move the governor piston 111 inwardly against the action of the centrifugal force which urges it outwardly, so that the conduit 119 is again closed by the land 115. On a further increase of speed of the casing 110, the centrifugal valve 111 moves outwardly again and admits an increased pressure to the conduits 121 and 120 before this pressure again causes an inward movement of the piston 111 to close the conduit 119. Similarly when the speed of the valve casing 110 decreases, the pressure in the conduits 120 and 121 is such as to move the piston 111 inwardly so as to open the orifice 110a to allow the escape of some of the fluid in these conduits and the fluid pressure in these conduits is thus automatically decreased in accordance with the decrease of governor speed. It will thus be apparent that the governor valve 111 automatically causes an increase and decrease of fluid pressure in the outlet conduit 120 which varies in accordance with the speed of rotation of the governor casing 110.

Figure 10:
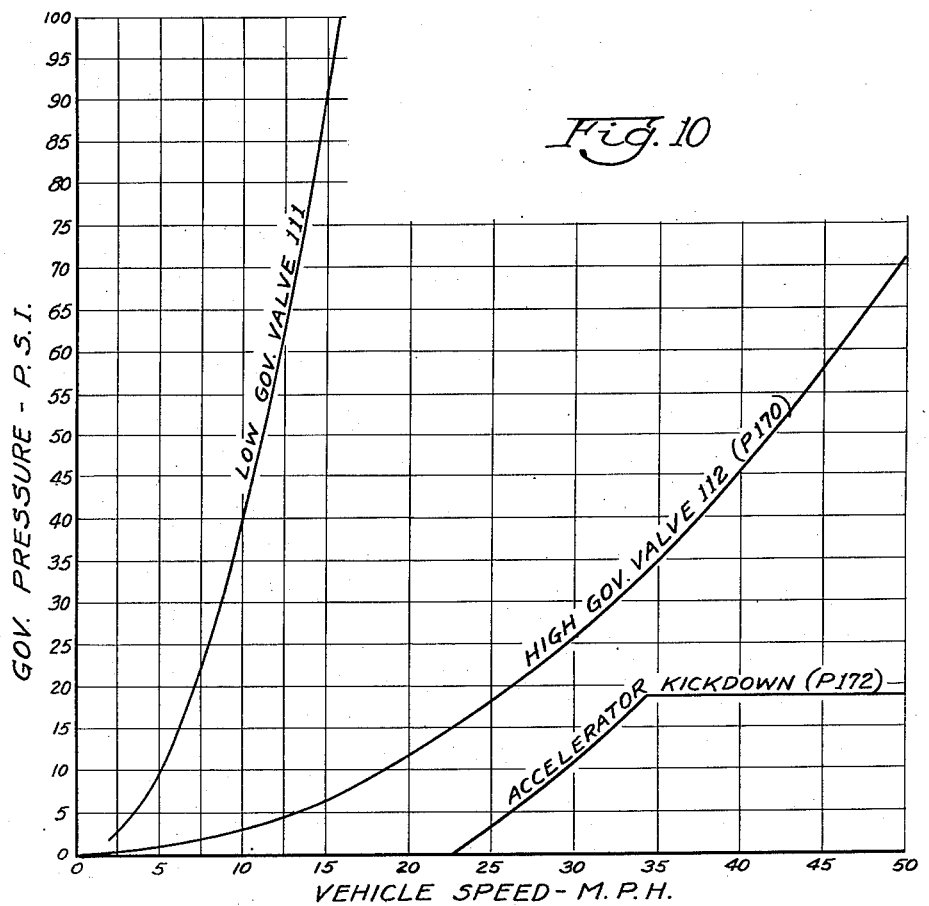

The governor valve 112 functions to provide a variable increasing and decreasing fluid pressure in the outlet conduit 124 corresponding to increasing and decreasing speeds of the governor casing 110, and the mode of operation of the governor valve 112 in doing this is the same as that of the governor valve 111 in connection with its outlet conduit 120. However, due to the smaller size of the weight 114 of the governor valve 112, the fluid pressure in the outlet conduit 124 is considerably less than is the fluid pressure in the conduit 120. The graph shown in Fig. 10 illustrates how the outlet pressures of the governor valve 111 and 112 vary with the speed of a vehicle and with each other. It will be understood, of course, that the values of fluid pressure will vary materially with changes in various dimensions of the system and that this graph is intended to be illustrative only.

With the valves 182 and 198 being in their low speed drive positions in which they are illustrated, the conduit 120 is connected with the conduit 191 by means of the groove between the lands 202 and 203 on the piston 200, and this fluid is thereby applied to the left hand end of the valve piston 184. The pressure from the governor valve 111 thus tends to move the valve piston 184 toward the right against the spring 198 and the fluid pressure from the conduit 143 which varies in accordance with the pressure in the engine manifold at the vehicle speeds at which an upshift can occur.

When the fluid pressure from the governor valve 111 increases sufficiently with increase in speed of the driven shaft 16 and of the vehicle, the piston 184 is thereby moved to the right so as to bring the land 186 within the constricted portion 183a of the valve casing portion 183. The groove in the piston 184 defined by the lands 186 and 187 in this position of the valve connects the conduits 193 and 192 so that the fluid under pressure from the conduit 143 is applied to the piston 89 for engaging the brake 44. With engagement of this brake the transmission is in second speed forward drive.

A smooth engagement of the brake 44 is obtained due to the action of the piston 216. During this movement of the valve piston 184 toward the right for changing the driving ratio to second speed forward, the lands 187 and 188 momentarily connect the pressure conduit 193 and the conduit 194. Fluid pressure in the conduit 194 acts on the piston 216 and moves the piston to the left as seen in Fig. 7. The piston acts on the spring 218 and through the pin 219, the plunger 215 causes a movement of the pressure control valve 152 to the left for thereby decreasing the fluid pressure in the conduits 142 and 143. The pressure regulating valve 152 without such influence of the piston 216 has the effect of providing a little excess of fluid pressure for the brake 44 at the particular torque being transmitted by the engine which would be necessary for completing the power train without slippage of the band, and the piston 216 functions to overcome this excess pressure and reduce it to the point where there is slippage, as the power train is completed. When the valve 184 has completed its movement, then the groove between the lands 187 and 188 connects the conduit 195 and the conduit 194 for draining the latter conduit through the discharge orifice 214, so that the piston 216 moves back to its normal position in which it is illustrated. Upon such return of the piston 216, the valve piston 152 returns to its normal position so as to raise the fluid pressure in the conduits 104 and 142, and increasing pressure is thus applied to the brake piston 89 for causing complete engagement of the brake 44. As will be apparent, the size of the orifice 214 determines the rate of return movement of the piston 216 and thereby the rate of engagement of the brake 44.

A change in driving ratio from second speed forward drive to third speed forward drive is obtained by a shift of the valve piston 200. This shift is caused by an increase of the pressure applied to the left end of the piston from the governor valve 112. During ordinary movement of the accelerator 164 in its throttle controlling range and before it contacts the abutment 179, the pin 175 is in its illustrated position in which the holes 167a are in communication with the conduit 172, and the discharge conduit 124 of the governor valve 112 is thereby connected with the conduit 172 leading to the left end of the valve piston 200. Fluid pressure from the governor 112 is thereby applied to the left end of the valve piston 200, and when this fluid pressure increases sufficiently with an increase in speed of the driven shaft 16 and thereby of the governor casing 110, the valve piston 200 is moved to the right as seen in Fig. 7 against the action of the spring 210 and the fluid pressure variable with manifold pressure and transmitted through the conduits 145 and 212 to the right end of the valve piston 200. When so moved, the land 205 of the piston 200 is brought within the constricted portion 199a of the valve casing portion 199, and the land 204 bears against this portion of the casing 199. The groove between the lands 205 and 206 connects the conduits 212 and 213, and inasmuch as the conduit 212 contains fluid variable with manifold pressure, this fluid is applied to the piston 59 for the friction clutch 55 for engaging the clutch.

When the valve 200 is in its shifted position, the groove between the lands 203 and 204 connects the conduit 211 with the fluid discharge orifice 214 for causing a controlled disengagement of the brake 52. During this movement of the valve piston 200, the groove between the lands 201 and 202 passes over the end of the conduit 191 in the casing 199 and connects this conduit through the opening 208, the bore 207, and the opening 209 with the discharge orifice 214, and any fluid pressure on the left end of the piston 184 holding it in its shifted position is released so that the piston 184 moves again into its positon in which it is illustrated in Fig. 7. With the piston 184 in this position, the conduit 192 is connected with the fluid discharge orifice 197 by means of the groove between the lands 186 and 187 for disengaging the brake 44. The orifice 197 is relatively small to provide a controlled disengagement of the brake 44 for helping to give a smooth change in speed ratio. During the return movement of the valve piston 184 to its illustrated position, it momentarily connects the pressure conduit 193 and the conduit 194 by means of the groove between its lands 187 and 188 for thereby moving the transition plunger 216 to the left as seen in Fig. 7 to temporarily decrease the pressure in the conduit 104 and connected conduits and thereby the pressure applied to the clutch piston 59 for giving a smooth engagement of the clutch. As the valve piston 184 completes its stroke, the conduit 194 is connected with the conduit 195 whereby fluid acting on the transition plunger 216 drains to the sump 20c through the discharge orifice 214 to give a controlled increase of fluid pressure in the conduit 104 and connected conduits to the normal pressure of the fluid. With the clutch 55 being engaged, the transmission drives in high speed or direct drive.

A change in driving ratio from third speed forward drive to fourth speed forward drive is obtained by a second movement of the piston 184 to the right as seen in Fig. 7 and this movement is obtained under the action of the discharge fluid pressure from the governor valve 112. When the valve piston 200 is in its third speed position, in which it is moved to the right of its illustrated position, the conduits 172 and 191 are connected, since the land 201 is to the right of the outlet of the conduit 191 in the casing portion 199. When the output fluid pressure of the governor 112 increases sufficiently with an increase of speed of the driven shaft 16, it thereby is effective to move the valve piston 184 to the right to bring its land 186 within the constricted casing portion 183a. In this position of the valve 184, as in its second speed forward drive position, the conduits 192 and 193 are connected and fluid under pressure from the conduit 193 is applied to the brake piston 89 for engaging the brake 44. Also during such movements as in the case of a shift to second speed forward drive, the transition plunger 216 is operated to momentarily decrease the pressure in the conduit 104 and connected conduits for giving a smooth engagement of the brake 44.

As is apparent from the above description, movement of the valve pistons 184 and 200 is dependent on the relative magnitudes of the fluid pressure variable with the manifold pressure impressed on the right ends of these valves and governor pressures impressed on the left ends of these valves. When either the governor pressures decrease or the fluid pressure responsive to manifold pressure increases, then the valves will move in the reverse sequence to that just described to downshift the transmission from fourth speed to third speed to second speed and finally to first speed.

It may be noted at this point that the centrifugal valve mechanism 95 has substantially no effect on the movement of the shiftable valves 184 and 200 and that substantially its only effect is in giving a smooth gradual engagement of the brake 52 for starting the vehicle. The valve mechanism 95 has little effect on the shiftable valves due to the fact that said centrifugal valve mechanism is closed prior to the time that the driven shaft governor 91 is rotating sufficiently to create sufficient fluid pressure to move the shiftable valves 184 and 200. The driven shaft governor valves 111 and 112 and the shiftable valves 184 and 200 operate to change the transmission driving ratio in a higher driven shaft speed range than the driven shaft speed range in which the centrifugal valve mechanism 95 operates, as it will be recalled that the latter closes at a relatively low driven shaft speed. In the range in which the shiftable valves 184 and 200 operate, the pressure regulating valve 152, without the influence of the centrifugal valve mechanism 95, determines the pressures in the fluid conduit 104 and those connected therewith. It is noteworthy also that the system includes a common pressure source (conduit 104 and connected conduits) which (1) provides an engine torque responsive signal for the automatically shiftable valves 182 and 198, (2) provides an engine torque responsive fluid pressure used to engage the bands and clutch with an engagement that varies with engine torque on ratio changes, and (3) provides an engine speed responsive pressure for establishing the drive for starting the vehicle.

Accelerator actuated overcontrol means are provided for downshifting the transmission ratio when extra power and speed ratio are required, as for passing another vehicle on the road. This downshift is obtained by moving the accelerator 164 through its throttle controlling range to move against the abutment 179 for thereby moving the pin 175 into its extended shift points position, as indicated on the drawing. The piston 166 is normally held in its illustrated position against the action of the spring 169 by the pin 175, and when the pin is so moved by the accelerator, the piston 166 moves to the left to block communication between the conduits 170 and 172.

The conduits 171 and 172 are always in communication with each other, and pressure within the conduit 172 is impressed on the left hand face of the piston 224 for purposes hereinafter to be described, and the pressure within the conduit 172 is also impressed on the right hand end of the piston 166, being transmitted to this end of the piston through the bore 228, opening 229, and conduit 173. The fluid pressure within the conduit 172 thus augments the action of the spring 169 in moving the piston 166 to the left, as seen in Fig. 7.

The net result of the output pressure of the governor piston 112 in conduit 170 acting on the left hand face of the piston 166 and the pressure within the conduit 172 and the spring 169 acting on the right hand end of the piston 166 is to cause the piston 166 to have a regulating action maintaining the pressure within the conduit 172 at a predetermined less value than the fluid pressure in the conduit 170. Referring to Fig. 10, it will be noted that the curve marked $P_{172}$ indicating the fluid pressure in the passage 172 is substantially 15 lbs. per sq. in. less than the pressure $P_{170}$ which indicates the output pressure of the governor valve 112, during the rising portion of the curve $P_{172}$. It will be understood that the definite pressure difference between $P_{172}$ and $P_{170}$ is, of course, dependent on the various dimensions of the parts being used, and this curve is intended for purposes of illustration only.

The valve 222 functions as an overcontrol on the valve 163 to limit the pressure $P_{172}$ after this pressure reaches a predetermined value, and this valve provides the flat portion of the curve $P_{172}$. When the pressure in the conduit 172 reaches the predetermined maximum, it moves the valve piston 224 to the right as seen in Fig. 7 against the action of the spring 230. The valve piston 224 is then in position to connect the output conduit 124 of the governor valve 112 and the conduit 232 with the conduit 173 through the groove between the lands 225 and 226 for thereby applying the full output governor pressure to the right end of the valve piston 166. The valve piston 166 is thus moved to the left to close the conduit 170 for preventing any additional fluid from entering the conduit 172, and the pressure within the conduit 172 thereafter remains at its maximum value which is shown by the horizontal straight line portion of the curve $P_{172}$.

The net effect of the valve 163 in reducing the pressure within the conduit 172 by a predetermined amount with respect to the output pressure of the governor valve 112 is to alter the vehicle speeds at which the ratio changes are made from second to third speed ratios toward higher vehicle speeds, and this effect of the valve 163 is in addition to that normally provided by the manifold controlled valve 152 which raises the pressures on the right hand ends of the shift valves 182 and 198 when the accelerator is depressed and the torque delivered by the engine is greater. As has been described, the pressure in the conduit 172 is effective to shift the valve 198 to the right to cause a change from second to third speeds.

The effect of the valve 222 is to limit the pressure in the conduit 172 at a value which will inhibit the fourth speed or overdrive ratio from coming into effect as long as the accelerator is held in its kickdown position. Without the valve 222, the pressure $P_{172}$ shown in Fig. 10 would continue to rise at a fixed value below the pressure $P_{170}$ and eventually the transmission would be shifted into its overdrive ratio by the effect of the pressure $P_{172}$ on the left hand end of the valve 182. The valve 222 in maintaining the pressure $P_{172}$ at a certain maximum value does not allow this pressure to become sufficiently high to shift the valve 182 to the right.

The effect of the manifold pressure controlled valve 152 in changing the vehicle speeds at which changes in ratio are made is illustrated in Figs. 11 to 13. It will be observed that the greater the throttle is opened by the accelerator and thereby the greater the torque that the engine exerts, and the greater is the absolute pressure (or in this case, the less is the vacuum), in the engine air intake manifold the higher the vehicle speeds are at which the various upshifts are made. These figures as well as the others illustrating specific values, of course, are not intended to in any way limit the invention, but only are included to more fully illustrate the operation of the transmission and controls by data regarding a particular installation.

The valve pistons 184 and 200 are so constructed as to cause a downshift of the transmission at substantially lower values of vehicle speed as compared with the upshift speeds, assuming that the fluid pressures due to the manifold actuated valve 152 and impressed on the right hand ends of these valves are constant. This action in the valve 182 is provided by the land 186 which enters the restricted portion 183a of the valve casing 183. When the piston 184 is in its illustrated position there is no pressure on the land 186 since this portion of the piston is in communication with the discharge orifice 197. When the valve piston is in its second and fourth speed position, the groove between the lands 186 and 187 connects the conduits 193 and 192, and the pressure in the conduit 193 is thereby impressed on both the side 187a of the land 187 and also on the side 186a of the land 186. Since, as is apparent from the drawing, the land 187 is larger in diameter than is the land 186, the pressure in the conduit 193 functions to provide an added force for holding the piston in its upshifted position, that is, in its position as shifted to the right as seen in Fig. 7.

A similar arrangement is utilized for causing the valve 200 to remain in its upshifted position, that is in its position to the right of its illustrated position, and this comprises the land 205 which enters the constricted portion 199a of the casing portion 199 when the valve is in its upshifted position. In the illustrated position of the valve, the land 205 is in communication with the discharge orifice 214, and no pressure is exerted thereon; however, when the valve is in its upshifted position, fluid pressure which passes from the conduit 212 to the conduit 213 between the lands 206 and 205 is impressed on both the side 206a of the land 206 as well as on the side 205a of the land 205. Since the land 206 is obviously larger than the land 205, this pressure in the conduits 212 and 213 creates an additional force for holding the valve piston 200 in its upshifted position.

Referring to Figs. 11, 12 and 13, the difference in upshifting vehicle speeds and downshifting vehicle speeds is illustrated with the lower dotted portions of the curves showing in each case the downshifting shift pattern of the transmission. This difference in shifting speeds is due to the reasons just described.

The transmission is operated in reverse by shifting the selector valve 127 to its reverse position which is indicated in Fig. 7. In this position, the conduit 144 is connected with the conduit 142 by means of the groove between the lands 134 and 135. Fluid under pressure is thereby applied to the piston 87 for engaging the brake 71, and the transmission is thereby conditioned to drive the shaft 16 in reverse. As has been described, in idling speeds of the vehicle engine, the valve pistons 107 are not pressed against their seats 109, and the pressure in the conduit 104 is only sufficient to slightly engage the brake to which the conduit 104 is connected; however, when the accelerator 164 is subsequently depressed, the valve pistons 107 close against their seats 109 and increase the pressure within the conduit 104 and the brake 71 is gradually and finally completely engaged. The engagement of the brake 71 to give a smooth start may be made as gradually as desired by a corresponding gradual opening movement of the accelerator, as is apparent. The shaft 16 is under these conditions being driven in reverse drive.

In cold weather conditions it may be desirable to cause engagement of either the brake 52 for completing a forward drive power train or the brake 71 for completing the reverse drive power train at higher engine speeds than under normal conditions. For providing this result, lands 137, 135, 134 and 132 with the notches 141, 140, 139 and 138 have been provided. By shifting the selector valve 127 only a portion of the distance from its neutral position to either its forward or reverse drive positions, a connection is provided between the fluid pressure supply conduit 142 and either of the conduits 144 or 145 through either of the notches 139 or 140, and the conduits 144 and 145 at the same time are connected with the sump 20c through either of the grooves 138 or 141 depending whether the transmission is conditioned for reverse or forward drive. Such a partial shifting of the valve 127 thus has the effect of providing a limited communication between either of the conduits 144 and 145 and the conduit 142 to provide a pressure within either of the former conduits which is a predetermined amount less than the pressure in the conduit 142. Engagement of either of the brakes 52 or 71 for completing the forward or reverse drives thus does not take place until the engine speed is higher than is normally required for engaging either of these brakes. There is less chance of stalling the vehicle engine when the valve 127 is utilized in this manner.

Although the transmission control arrangement may be utilized with only one fluid pump, in order that the vehicle engine may be started by pushing or towing the vehicle, the second fluid pump 234 is preferably provided. This pump is connected to the conduit 104 by means of a conduit 235, and this pump supplies pressure to the same control elements as does the pump 96 when it is operative. Since, when the engine is inoperative, the shaft 17 is stationary and the valve plungers 107 do not engage with their seats 109, it is necessary to close the drain conduit 238 for the centrifugal clutch mechanism 95. This may be done by means of the valve 240 selectively actuated in any suitable way. With the valve 240 closed, rotation of the driven shaft 16 as by pushing or towing the vehicle will cause the pump 234 to deliver fluid for engaging the brake 52, for example, for completing a forward drive power train through the transmission.

The transmission is lubricated by means of the conduit 241 which extends through the shafts 17, 18 and 16 and the casing portion 20a. This conduit is connected to the pressure conduit 143 and an orifice 242 is provided between the conduits 143 and 241 for limiting the flow through the conduit 241. The friction brake band 54 is cooled by fluid discharged from the centrifugal valve mechanism 95 through the conduit 238. This fluid is discharged into the trough 239 disposed to conduct fluid between the two ends of the band 54, and the fluid thereafter flows through the internal groove provided in the internal surface of the band. It will be noted that the valve mechanism 95 normally discharges fluid when the vehicle is being started. As has been explained, this results in a lower pressure within the conduit 104 and causes only enough engagement of the brake band so that only a slipping engagement is obtained. It is at this time in particular that cooling of the band 54 is necessary, and it is at just this time that the valve mechanism 95 provides cooling fluid for the band. This same arrangement can also be used in connection with the brake 71 so that the band 73 is cooled for a start in reverse, and if desired, the band 46 may also be cooled in this manner.

As has been described, the manifold vacuum pressure valve 152 provides a fluid pressure within the conduit 104 that varies with the torque being transmitted by the vehicle engine assuming that the speed of the engine is high enough to maintain the valve plungers 107 closed on their seats 109. When the accelerator 164 is completely released when descending hills, there would be danger of the valve 152 providing insufficient fluid pressure to maintain the friction bands and clutch, as the case may be, engaged for maintaining a drive through the transmission unless some means are provided for limiting the lowest pressure to be exerted on the diaphragm 150. I have provided such a limiting means in the valve 158. When the pressure within the conduit 151 decreases below a predetermined value, the ball 159 is drawn off its seat 160 against the action of the spring 161 to admit air into the conduit 151. This valve 158 is thus effective for causing at least a sufficient fluid pressure to be present in the conduit 104 which will assure engagement of the bands and clutch, as the case may be, under these conditions. The effect of the valve 158 on the pressure in the conduit 104 is indicated by the lowest horizontal portion of the curve in Fig. 9 showing the fluid pressure when a 6½ lb. per sq. in. absolute pressure is impressed on the diaphragm 150.

Referring to Fig. 14, the illustrated embodiment of the control arrangement includes the substitution of a simple sharp edged orifice 250 for the centrifugal valve unit 95. I have found that the flow of fluid through this orifice causes very nearly the same increase of fluid pressure within the conduit 104 as does the centrifugal valve mechanism 95. This is due to the increased flow of fluid through the orifice with increase of speed of the shaft 17 and of the vehicle engine and also due to the fact that at high speeds of the shaft 17, the proportionate discharge of fluid through the orifice as compared to the output from the drive shaft pump is substantially negligible. The arrangement shown in this figure is otherwise the same as the embodiment that has just been described.

Referring to Fig. 15, a different type of gear set is illustrated for the use in connection with the above described controls. This gear set comprises a drive shaft 260, a driven shaft 261, an overdrive gear set 262 and an underdrive gear set 263, with the gear sets 262 and 263 being connected in tandem between the shafts 260 and 261.

The overdrive gear set 262 comprises a ring gear 264, a sun gear 265, planet gears 266 (one being shown in the drawing) in mesh with the sun and ring gears and a planet gear carrier 267 for the gears 266.

The sun gear 265 constitutes the reaction element of the gear set, and the sun gear carries a brake drum 268 on which a brake band 269 is adapted to operate. A one-way clutch 270 is provided effectively between the carrier 267 and the sun gear 265, and this comprises rollers 271 adapted to engage oppositely disposed cam surfaces 272 and 273 formed respectively on the carrier and sun gear, with the cam surfaces being so arranged that when the shaft 260 drives, the one-way clutch 271 engages so as to drive the ring gear 264, with the parts 264, 265, 266 and 267 all rotating as a unit in locked up condition.

The underdrive gear unit 263 comprises sun gears 274, 275 and 276. The sun gear 274 is formed on the shaft 261, as shown. A friction brake comprising a brake band 277 acting on a brake drum 278 is provided for the sun gear 275, and a friction brake comprising a brake band 279 acting on a brake drum 280 is provided for the sun gear 276.

The gear set 263 comprises planet gears 281 (one being shown in the drawing) having gear portions 282, 283 and 284 which are respectively in mesh with the sun gears 274, 275 and 276. The planet gears 281 are rotatably disposed on a planet gear carrier 285 which is connected with the ring gear 264.

A friction clutch comprising clutch plates 286 and 287 is provided for frictionally connecting the brake drum 278 and the brake drum 280 for locking together the sun gears 275 and 276. The friction clutch comprises a stationary pressure plate 288 and a movable pressure plate 289, and the latter pressure plate is adapted to be acted on by a fluid pressure operated piston 290.

The three friction brake bands 269, 279 and 277 are intended to be operated by fluid pressure responsive motors similar to the brake bands 46, 54 and 73 in the first embodiment of the invention, and the motors for acting on the bands 269, 279 and 277 are connected in the fluid diagram of Fig. 7 in the same manner as are the fluid motors for the three bands 46, 73 and 54 respectively. The piston 290 for engaging the friction clutch for connecting the two sun gears 275 and 276 is connected in the same manner as is the piston 59 in the first embodiment of the invention.

The transmission illustrated in Fig. 15 provides four speeds in forward and a drive in reverse, similar to the first illustrated embodiment of the invention. Low speed forward drive is provided with the band 269 disengaged and the band 277 engaged. The planet gear set 262 has all of its parts rotating together as a unit with these parts held in such relation by the one-way clutch 270, and the planet gear carrier 285 is thus driven at the same speed as the drive shaft 260. With the sun gear 275 held stationary, the planet gear unit 263 functions to drive the driven shaft 261 at a low speed underdrive with respect to the carrier 285, and the transmission as a whole is in low or first speed. A change in driving ratio to second speed forward drive is obtained by engaging the brake band 269 so that the planet gear unit 262 drives its ring gear 264 at an overdrive with respect to the drive shaft 260, and the transmission as a whole is in second speed forward drive.

A change in the driving ratio into direct or third speed forward drive is obtained by engaging the friction clutch for coupling together the two sun gears 275 and 276, and the brake band 269 is disengaged. The planet gear unit 263 is then in direct drive, and the planet gear unit 262 is also in direct drive with the drive proceeding through the one-way clutch 271, so the transmission as a whole is in direct drive with the shaft 261 being rotated along with and at the same speed as the drive shaft 260. A change in the driving ratio into overdrive or fourth speed forward drive is obtained by engaging the brake band 269 so that the planet gear set 262 is then effective to drive its driven element, the ring gear 264, at an overdrive, and the transmission as a whole is then in overdrive.

With the fluid pressure motors for the brake bands 269, 279 and 277 connected as above described in lieu of the motors for the bands 46, 54 and 73 in the first embodiment and with the clutch fluid pressure responsive motor 290 being connected as is the motor 59 for the clutch 55 in the first embodiment, the second embodiment of the invention illustrated in Fig. 15 will operate in the same manner as does the first embodiment, as will be apparent.

My improved transmission advantageously utilizes a fluid pressure operated brake, either the brake 52 or the brake 277 for completing a power train through the transmission for starting the vehicle in which the transmission is installed. The brake is engaged by a speed responsive device, such as the centrifugal valve mechanism 95 or the orifice 250, so that the brake engages gradually as the speed of the drive shaft of the transmission increases, and this gives a smooth and pleasing start to the vehicle. The brakes and clutches in the transmission embodiments are also made pressure responsive to the pressure in the manifold of the vehicle engine which pressure varies with the torque transmitted by the engine. It is contemplated that by this means, just sufficient fluid pressure is applied to the brake and clutch engaging motors so as to give a sure engagement for the amount of torque being transmitted by the vehicle engine, and by this means smooth engagements of the friction brakes and clutches for completing the various higher speed drives are obtained. It will be noted that a common fluid pressure supply which is regulated both by the centrifugal valve mechanism 95 or orifice 250 and by the manifold pressure operated valve 152 is provided for the threefold purpose of engaging a friction engaging element for starting the vehicle, shifting the shiftable valves 182 and 198 and providing an engaging pressure for the friction engaging elements upshifting the transmission that increases with engine torque. The connection to the manifold by the valve 152 for regulating in accordance with engine torque eliminates the trouble which has been experienced with throttle linkages and their adjustments and provides an oil pressure more nearly proportional to the torque of the engine than a throttle linkage could give.

In order that the manifold pressure operated regulating valve 152 is not effective to reduce the fluid pressure too greatly when the engine is driving at little or no torque, as when the vehicle is descending hills, I have provided the limiting valve 158 which limits the lowermost pressure which may be applied on the diaphragm 150 acting on the valve 152. Incidentally, after the transmission has thus once been placed in one of its speed ratios, the fluid pressure applied to the motors for the friction brakes or clutches does not thereafter decrease sufficiently to allow slippage of the brakes or clutches regardless of the torque with which the engine is driving.

As has been explained, the regulating valve 152 provides just sufficient fluid pressure so that there is no danger of slippage of the friction brakes or clutches after the valves 184 and 200 have been effective to shift the transmission into one of its speed ratios. The transition plunger 216 has been provided in order to momentarily reduce this pressure so that a smooth engagement of the friction brake or clutch which is being engaged to complete a power train is obtained. This transition plunger acts on the regulating valve 152 and against the spring 156, as has been described. The use of the piston 216 effective when a change in the driving ratio is made is more consistent than the general practice of controlling the flow of oil with orifices in the fluid line supplying the operators for the friction brakes or clutches, since the plunger 216 always involves the same displacement of fluid regardless of facings wear and is not effected by leaks at rotating seals. Also, it does not prevent the rapid takeup of release clearance as the conventional method does.

An advantageous arrangement of shiftable valves 184 and 200 has also been provided. One of these valves, valve 200, has been provided for causing ratio changing in the planetary unit 24 in the first embodiment of the invention and the other valve, valve 184, has been provided for causing ratio changing in the other change speed unit 23 which is connected in series or tandem with the first. Due to the fact that the governor valve 112 is connectible with both valves 184 and 200, and the connection with the valve 184 is dependent on the valve 200, only these two shiftable valves are required for three changes of ratio. The same fluid pressure regulated in accordance with torque by the regulating valve 152 is provided for acting on one end of each of these shiftable valves, as has been described, and fluid pressure regulated according to the speed of the driven shaft of the transmission is provided for acting on the other ends of these valves so that operation of both in accordance with torque transmitted by the engine and also in accordance with the speed of the driven shaft is obtained.

In order that for the same torque transmitted by the engine, a downshift is obtained at a lower speed ratio than an upshift for each of the shiftable valves 184 and 200, I have provided the stepped portions 186 and 205 respectively on the valves. These stepped portions are so effective when either of the valves is in its upshifted position to prohibit a downshifting movement of the valve until the fluid pressure regulated by the governor mechanism driven by the driven shaft has decreased to a lower value than is necessary for upshifting the valve. This arrangement prohibits any hunting that might occur by the shiftable valves 184 and 200 if they were arranged to upshift and downshift at the same governor speeds.

Although the shifting of the shiftable valves 184 and 200 is responsive to the torque transmitted by the engine due to the fluid pressure regulated by the valve 152 impressed on the right ends of these valves, I have nevertheless provided over control means for these valves to render them shiftable under the control of the vehicle accelerator. The extra performance valve 163 is provided for this purpose, and as has been explained, when the accelerator is moved to an open throttle kickdown position, the resulting movement of the extra performance valve results in a lowering of the fluid pressure from the governor valve 112 by a predetermined amount. The result of this action of this valve is that upshifts are obtained only at predetermined higher speeds of the driven shaft than normally, and for the same speed of the driven shafts the transmission will be downshifted to provide extra torque, which the vehicle operator commonly desires when he moves his accelerator to completely open throttle position. The limit valve 222 on the fluid pressure output of the governor valve 112 is effective to limit this fluid pressure impressed on the shiftable valves 184 and 200 to a predetermined value which will inhibit the transmission from being in its high speed ratio when the accelerator is at its open throttle kickdown position. This is also a desirable result.

During cold weather, it is desirable that completion of the starting power train through the transmission be delayed until the engine has reached higher speeds of operation than normally, in order that the engine be not stalled. With my improved transmission control, this result is obtained by providing the portings 138, 139, 140 and 141 on the manual control valve 127, which when the valve is midway between its neutral and its forward and reverse positions allow a bypassing to the sump of a portion of the fluid discharged by the pump 96. The centrifugal valve mechanism 95 or the orifice 250 must under these conditions provide a higher pressure which would result from a higher speed of rotation of the drive shaft 15 for an engagement of the starting power train to be effected.

In order that the vehicle engine may be started by pushing or towing the vehicle, in case for example the electrical system of the vehicle should fail, I have provided the driven shaft pump 234 and the valve 240. Since when the vehicle engine is inoperative, the centrifugal valve mechanism 95 is open, no pressure would be available unless the discharge from the centrifugal valve mechanism is blocked, and the valve 240 satisfies this requirement. The valve 240 is closed when it is desired to start the engine by towing or pushing it, and the driven shaft pump is then effective to provide the necessary pressure for engaging the forward starting friction brake 52 or the other power train completing friction clutches or brakes.

The pressure regulating valve 152 is so constructed that it provides a pressure regulating action which is substantially independent of the volume of fluid being transmitted by the pumps 96 and 234. This advantageous function I ascribe to the construction of this valve and its arrangement with its seat 155 with the valve face 153a overlying the seat, as has been shown and described. An advantageous working of the engine driven pump 96 is obtained due to its connection with the valve 152 and sump 20c. The discharge from the regulating valve 152 is directed into the inlet side of the pump rather than into the sump, and it is only the difference between the pump requirements and the discharge from the regulating valve 152 that is taken from the sump, and thus the unnecessary foaming and churning of the fluid that would be obtained if the full requirements of the pump were taken from the sump is not obtained.

An advantageous cooling arrangement is provided for the starting brakes 52 and 71. This includes the circumferential grooves formed in the inner surfaces of the brake bands through which the discharge from the centrifugal mechanism 95 or the orifice 250 is conducted. The brakes 52 and 71 are normally slipping when the centrifugal valve, for example, is open, and thus the valve mechanism provides the cooling fluid at just the time when needed.

In lieu of the centrifugal valve mechanism 95, I have also provided as an alternative the orifice 250 which may be used instead for providing substantially the same brake engaging results for starting the vehicle. This is a considerably simpler construction.

I have also provided improved gear sets for use in connection with my transmission controls which not only provide ratios that are suitably spaced for driving an ordinary automotive vehicle but which are simple in construction and economical to manufacture. It is considered advantageous my mechanical units have no mechanical devices, such as synchronizers, pawls, cams, or sliding gears, for the driver to manipulate. The only connection with the engine is the splined fitting at the flywheel with the engine crankshaft and a pressure line from the manifold. The only two controls for the driver to operate are the manual selector valve 127 with a finger tip control lever 128 and the accelerator.

I wish it to be understood that my invention is not to be limited to the specific constructions, arrangements and devices shown and described, except only insofar as the claims may be limited, as it will be apparent to those skilled in the art that changes may be made without departing from the principles of the invention.

In the construction of the appended claims, I wish it to be particularly understood that where I refer to engaging means, I intend to include by such terminology both brakes and clutches.

I claim:

1. In transmission mechanism for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratio and each power train including a fluid pressure operated friction engaging means for completing the train, means providing a common fluid pressure source for said friction engaging means and controlled by the speed of said drive shaft at low speeds thereof, and according to variations in torque of said engine at higher speeds of the drive shaft, said last-named means including a pump driven by one of said shafts, a centrifugal valve operated by said drive shaft for relieving the fluid pressure output of said pump, and a valve connected with the engine manifold and controlled by variations in pressure therein, also connected with the pump for relieving the pressure of fluid discharged by the pump, and valve means for connecting said fluid pressure operated friction engaging means individually with said pump according to the position of the valve means whereby one of said friction engaging means may be engaged to complete an initial power train through the transmission according to the speed of said engine and said drive shaft, and another of said friction engaging means for a higher ratio power train between said shafts may be engaged with an engagement which is variable with engine torque.

2. In transmission mechanism, the combination of a drive shaft, a driven shaft, means for providing power trains between said shafts of different speed ratio and each power train including a fluid pressure operated friction engaging means for completing the train, a shiftable valve for connecting a fluid pressure source with various of said friction engaging means for changing the speed ratio through the transmission mechanism, and means providing a common fluid pressure source for said friction engaging means and said shiftable valve controlled by the speed of said drive shaft at low speeds thereof for initially applying one of said friction engaging means to complete a low speed ratio power train between said shafts, and controlled by the torque on said drive shaft at higher speeds of the shaft for applying a drive shaft torque variable shifting force to said shiftable valve, and for providing a drive shaft torque controlled variable engagement of another friction engaging means for a higher speed ratio.

3. In transmission mechanism, the combination of a drive shaft, a driven shaft, means for providing power trains between said shafts of different speed ratio and each power train including a friction engaging means for completing the train, a shiftable member having a plurality of positions for controlling engagement of various of said friction engaging means to complete different power trains through the transmission mechanism, means for engaging one of said friction engaging means according to the speed of said drive shaft for initially completing one of said power trains through the transmission mechanism, and means responsive to the torque on said drive shaft for applying a shift force on said shiftable member, and for providing an engagement of the friction engaging means selected by said shiftable member with a pressure continuously variable with the torque on said drive shaft.

4. In transmission mechanism, the combination of a drive shaft, a driven shaft, means for providing power trains between said shafts of different speed ratio and each power train including a fluid pressure operated friction engaging means for completing the train, a shiftable valve adapted to connect different ones of said friction engaging means with a source of fluid in the various positions of the valve, and means providing a common fluid pressure source for said friction engaging means and for said valve, said last-named means including a pump, a fluid flow restricting means for relieving the fluid pressure discharged by the pump and responsive to the speed of the drive shaft at low speeds thereof for initially applying one of said friction engaging means to complete a low speed power train between said shafts, and a second fluid flow restricting means responsive to the torque on said drive shaft at higher speeds thereof for applying a drive shaft torque variable shifting force to said shiftable valve and for providing a drive shaft torque controlled variable engagement of another friction engaging means for a higher speed ratio.

5. In a transmission for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratios and each power train including a fluid pressure operated friction engaging means for completing the train, a shiftable valve adapted to connect a source of fluid with various of said friction engaging means in its different positions for changing the speed ratio through the transmission, and means providing a common fluid pressure source for said friction engaging means and for said shiftable valve controlled by the speed of said drive shaft at low speeds thereof for initially engaging one of said friction engaging means to complete a low speed ratio power train between said shafts, and controlled according to the pressure in said manifold and thereby according to the torque on said drive shaft at higher speeds of the drive shaft for applying an engine torque variable shifting force to the shiftable valve for shifting it to a higher speed ratio position, and for providing an engine torque controlled variable engagement of another friction engaging means for a higher speed ratio.

6. In a transmission for an automotive vehicle having a driving engine with an intake manifold the pressure in which varies with the torque transmitted by the engine, the combination of a drive shaft adapted to be driven by said engine, a driven shaft, means for providing power trains between said shafts of different speed ratio and each power train including a fluid pressure operated friction engaging means for completing the train, a shiftable valve for connecting various of said friction engaging means with a source of fluid in various positions of the valve for shifting the transmission in various speed ratios, and means providing a common fluid pressure source for said friction engaging means and for shifting said shiftable valve, said last-named means including a pump, a fluid flow restricting means for relieving the fluid pressure discharged by the pump and responsive to the drive shaft speed at low speeds thereof for engaging one of said friction engaging means according to drive shaft speed to provide an initial low speed ratio between said shafts for starting the vehicle, and a valve for relieving the fluid pressure discharged by the pump and connected to be operated by the pressure in the manifold for providing a fluid pressure variable with the engine torque at higher speeds of the drive shaft tending to shift the shiftable valve and for providing an engine torque controlled variable engagement of another friction engaging means for a higher speed ratio.

7. In a transmission for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratio and each power train including a fluid pressure operated friction engaging means for completing the train, a shiftable valve adapted to connect a source of fluid pressure with various ones of said friction engaging means in different positions of the valve for changing the transmission between its ratios, and means providing a common fluid pressure source for said friction engaging means and for said shiftable valve controlled by the speed of said drive shaft at low speeds thereof and according to the engine torque at higher speeds of the drive shaft for initially engaging one of said friction engaging means to complete a low speed ratio power train between said shafts according to the speed of the drive shaft for starting the vehicle and for applying a shifting force to the shiftable valve and an engaging pressure to one of said engaging means for completing a higher speed ratio power train which vary according to the engine torque, said last-named means including a pump driven by said drive shaft, centrifugal valve means for throttling the fluid pressure output of said pump and driven by said drive shaft, and a pressure responsive valve connected with said manifold so as to be responsive to the pressure therein and relieving the fluid pressure discharged by said pump.

8. In a transmission for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratio and each power train including a fluid pressure operated friction engaging means for completing the train, a shiftable valve for connecting various of said friction engaging means with a source of pressure in the different positions of the valve, and means providing a common fluid pressure source for said friction engaging means and for said shiftable valve controlled by the speed of said drive shaft at low speeds thereof for initially engaging one of said friction engaging means according to the drive shaft speed for completing a low speed ratio power train between said shafts, and controlled in accordance with the manifold pressure at higher speeds of said drive shaft for applying an engine torque controlled variable shifting force to the shiftable valve, and for applying an engine torque controlled variable engaging pressure to a friction engaging means for a higher speed ratio, said last-named means including a pump driven by said drive shaft, means providing an orifice for relieving the fluid pressure discharged by said pump and regulating the pressure according to the speed of the drive shaft, and a pressure responsive valve for also relieving the fluid pressure discharged by said pump and connected with said manifold for regulating the fluid pressure according to the engine torque at higher speeds of the drive shaft.

9. In transmission mechanism, the combination of a drive shaft, a driven shaft, means for providing power trains between said shafts of different speed ratio and each power train including a fluid pressure operated friction engaging means for completing the train, a shiftable valve for connecting a fluid pressure source with various of said friction engaging means for changing the speed ratio through the transmission mechanism, means providing a common fluid pressure source for said friction engaging means and said shiftable valve controlled by the speed of said drive shaft at low speeds thereof for initially applying one of said friction engaging means to complete a low speed ratio power train between said shafts, and controlled by the torque on said drive shaft at higher speeds of the shaft for applying a drive shaft torque controlled variable shifting force to said shiftable valve, and for providing a drive shaft torque controlled variable engagement of another friction engaging means for a higher speed ratio, and fluid pressure means responsive to the speed of said driven shaft for applying a fluid pressure to said shiftable valve varying with the driven shaft speed tending to shift the valve to a higher speed ratio position, said fluid pressure variable with drive shaft torque tending to shift said valve to a lower ratio position.

10. In transmission mechanism, the combination of a drive shaft, a driven shaft, means for providing power trains between said shafts of different speed ratio and each power train including a friction engaging means for completing the train, a shiftable member having a plurality of positions for controlling engagement of various of said friction engaging means to complete different power trains through the transmission mechanism, means for engaging one of said friction engaging means according to the speed of said drive shaft for initially completing one of said power trains through the transmission mechanism, means responsive to the torque on said drive shaft for applying a shift force on said shiftable member and for providing an engagement of the friction engaging means selected by said shiftable member with a pressure corresponding to the torque on said drive shaft, and means responsive to the speed of said driven shaft for applying a shift force on said shiftable member tending to move it to a higher speed ratio position, said first-named member shifting means responsive to drive shaft torque tending to shift the shiftable member to a lower speed ratio position.

11. In transmission mechanism, the combination of a drive shaft, a driven shaft, means for providing power trains between said shafts of different speed ratio and each power train including a fluid pressure operated friction engaging means for completing the train, a shiftable valve adapted to connect different ones of said friction engaging means with a source of fluid in the various positions of the valve, means providing a common fluid pressure source for said friction engaging means and for said valve, said last-named means including a pump, a fluid flow restricting means for relieving the fluid pressure discharged by the pump and responsive to the speed of the drive shaft at low speeds thereof for initially applying one of said friction engaging means to complete a low speed power train between said shafts and a second fluid flow restricting means responsive to the torque on said drive shaft at higher speeds thereof for applying a drive shaft torque variable shifting force to said shiftable valve, and for providing a drive shaft torque controlled variable engagement of another friction engaging means for a higher speed ratio, and fluid pressure means including a hydraulic governor for providing a fluid pressure variable with the speed of said driven shaft and applied to said shiftable valve tending to shift the valve to a higher speed ratio position, said common fluid pressure source providing a pressure tending to shift the shiftable valve to a lower speed ratio position.

12. In a transmission for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratio and each power train including a fluid pressure operated friction engaging means for completing the train, a shiftable valve adapted to connect a source of fluid with various of said friction engaging means in its different positions for changing the speed ratio through the transmission, means providing a common fluid pressure source for said friction engaging means and for said shiftable valve controlled by the speed of said drive shaft at low speeds thereof for initially engaging one of said friction engaging means to complete a low speed ratio power train between said shafts, and controlled according to the pressure in said manifold and thereby according to the torque on said drive shaft at higher speeds of the drive shaft for applying an engine torque controlled variable shifting force to the shiftable valve, and for providing an engine torque variable engagement of another friction engaging means for a higher speed ratio, and means providing a variable fluid pressure according to the speed of said driven shaft and including a hydraulic governor driven by said shaft and applying a fluid pressure to said shiftable valve tending to shift the valve to a higher speed ratio position, said common pressure source providing a fluid pressure tending to shift the valve to a lower speed ratio position.

13. In a transmission for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratio and each power train including a fluid pressure operated friction engaging means for completing the train, a shiftable valve adapted to connect a source of fluid pressure with various ones of said friction engaging means in different positions of the valve for changing the transmission between its ratios, means providing a common fluid pressure source for said friction engaging means and for said shiftable valve controlled by the speed of said drive shaft at low speeds thereof, and according to the engine torque at higher speeds of the drive shaft, for initially engaging one of said friction engaging means to complete a low speed ratio power train between said shafts according to the speed of the drive shaft for starting the vehicle and for applying a shifting force to the shiftable valve and an engaging pressure to one of said engaging means for completing a higher speed ratio power train which vary according to the engine torque, said last-named means including a pump driven by said drive shaft, centrifugal valve means for throttling the fluid pressure output of said pump and driven by said drive shaft, and a pressure responsive valve connected with said manifold so as to be responsive to the pressure therein and relieving the fluid pressure discharged by said pump, and fluid pressure means responsive to the speed of said driven shaft and including a hydraulic governor driven by this shaft for applying a fluid pressure to said shiftable valve tending to shift the valve to a higher speed ratio position, said common pressure source providing a fluid pressure tending to shift the shiftable valve to a lower speed ratio position.

14. In a transmission for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratio and each power train including a fluid pressure operated friction engaging means for completing the train, a shiftable valve for connecting various of said friction engaging means with a source of pressure in the different positions of the valve, means providing a common fluid pressure source for said friction engaging means and for said shiftable valve controlled by the speed of said drive shaft at low speeds thereof for initially engaging one of said friction engaging means according to the drive shaft speed for completing a low speed ratio power train between said shafts, and controlled in accordance with the manifold pressure at higher speeds of said drive shaft for applying an engine torque variable shifting force to the shiftable valve, and for applying an engine torque controlled variable engaging pressure to a friction engaging means for a higher speed ratio, said last-named means including a pump driven by said drive shaft, means providing an orifice for relieving the fluid pressure discharged by said pump and regulating the pressure according to the speed of the drive shaft, and a pressure responsive valve for also relieving the fluid pressure discharged by said pump and connected with said manifold for regulating the fluid pressure according to the engine torque at higher speeds of the drive shaft, and fluid pressure operated means varying according to the speed of said driven shaft and including a hydraulic governor driven by the driven shaft for applying a fluid pressure to said shiftable valve tending to shift the valve to a higher speed ratio position, the fluid pressure from said common pressure source tending to shift said shiftable valve to a lower speed ratio position.

15. In a transmission, the combination of a drive shaft, a driven shaft, means for providing a power train between said shafts and including a planetary gear set and a brake for an element of the gear set for completing the power train when engaged, means for engaging said brake according to the speed of one of said shafts and including speed responsive governing means driven by said shaft, and means for operatively connecting said brake and said governing means, and means for varying the torque transmitting capacity of said brake in accordance with the torque on said drive shaft.

16. In a transmission, the combination of a driving shaft, a driven shaft, means for providing a power train between said shafts and including a planetary gear set and a friction brake for an element of the gear set for completing the power train when engaged, a source of fluid pressure, fluid pressure responsive means for engaging said brake and adapted to be connected with said fluid pressure source, means effective on said fluid pressure source for varying the pressure delivered thereby to said fluid pressure responsive brake engaging means according to the speed of one of said shafts and including a speed responsive device driven by said shaft, and means for varying the torque transmitting capacity of said brake in accordance with the torque on said drive shaft.

17. In a transmission for an automotive vehicle having a driving engine with an intake manifold the pressure in which varies with the torque transmitted by the engine, the combination of a drive shaft, a driven shaft, means for providing a plurality of power trains of different speed ratio between said shafts, means for changing the transmission between its various speed ratios and including engaging means completing the various speed ratios and a valve having a position corresponding to each of the speed ratios, a source of fluid pressure, means for applying said fluid pressure to said valve for shifting the valve from one of its said positions to another, and means connected with said intake manifold for regulating the pressure of fluid applied to said changing means for shifting the valve between its various positions and for varying the torque transmitting capacity of the engaging means in accordance with the pressure within said manifold.

18. In a transmission for an automotive vehicle having a driving engine with an intake manifold the pressure in which varies with the torque transmitted by the engine, the combination of a drive shaft, a driven shaft, means for providing power trains of different speed ratio between said shafts, means for changing the transmission between its various speed ratios and including a shiftable valve having a position corresponding to each of the speed ratios, a source of fluid pressure including a pump adapted to be connected to one end of the shiftable valve for shifting the valve, means for regulating the pressure of the fluid from said pump and applied to said shiftable valve in accordance with the manifold pressure and including a regulating valve connected with said manifold and controlled by the pressure therein, and governing means driven by said driven shaft for applying a fluid pressure to the other end of said shiftable valve which varies in accordance with the speed of the driven shaft.

19. In a transmission for an automotive vehicle having a driving engine with an intake manifold the pressure in which varies with the torque transmitted by the engine, the combination of a drive shaft, a driven shaft, means for providing a power train between said shafts and including a friction engaging means for completing the power train when engaged, means connected with said manifold and responsive to the pressure in the manifold for engaging said engaging means and for applying an engaging pressure which varies according to the pressure in the manifold, said last-named means including a pressure responsive diaphragm connected with the manifold, and means for limiting the pressure impressed on said diaphragm to a predetermined minimum value for thereby limiting the engaging pressure to at least a minimum value.

20. In a transmission for an automotive vehicle having a driving engine with an intake manifold the pressure in which varies with the torque transmitted by the engine, the combination of a drive shaft, a driven shaft, means for providing a power train between said shafts and including a friction engaging means for completing the power train when engaged, a fluid pressure responsive motor for engaging said engaging means, a source of fluid pressure including a pump adapted to be connected to said motor, a fluid pressure regulating valve for regulating the pressure of the fluid discharged from said pump and applied to said motor, said regulating valve being connected with said engine manifold for thereby regulating the fluid pressure in accordance with the manifold pressure, and a fluid pressure operated plunger effective on said regulating valve and arranged to temporarily operate on said valve when the transmission is being shifted to complete said power train for temporarily reducing the fluid pressure on said motor.

21. In a transmission for an automotive vehicle having a driving engine with a fuel intake manifold the pressure in which varies with the torque transmitted by the engine, the combination of a drive shaft, a driven shaft, means for providing a plurality of power trains between said shafts each including a friction engaging means for completing the respective power train when engaged, a fluid pressure motor for engaging each of said engaging means, a source of fluid pressure including a pump driven by one of said shafts and adapted to be connected to said motors, a fluid pressure regulating valve connected with said manifold to be controlled by the pressure in the manifold for regulating the pressure applied to either of said motors in accordance with the manifold pressure, a shiftable valve for shifting the transmission from one speed ratio to another by operatively connecting one of said motors with said fluid pressure source and disconnecting the other motor with said source, and means for initially reducing the fluid pressure applied to the motor for the engaging means completing a power train when a shift of the transmission is being made for allowing an initial slip of engaging means and including a plunger effective on said regulating valve and having fluid pressure applied thereto temporarily during a shift of said shiftable valve.

22. In a transmission, the combination of a drive shaft, a driven shaft, two change-speed units connected in series between said shafts, a hydraulic shift valve connected with each of said units and each of the valves being movable between a pair of positions for shifting the respective unit between its speed ratios, and a pair of hydraulic governors driven by one of said shafts and each of the governors providing a fluid pressure that varies according to the speed of the shaft, one of said governors being connected with one of said valves when the other valve occupies one of its positions and the other of said governors being connected with the other of said valves for shifting the respective valves, said other governor being connected with said one valve and said one governor being disconnected from said valve when the other valve occupies its other position.

23. In a transmission, the combination of a drive shaft, a driven shaft, first and second change-speed units connected in tandem between said shafts, hydraulic means for shifting the change-speed units between their speed ratios and including a first hydraulic valve effectively connected with said first unit and a second hydraulic valve effectively connected with said second unit, first and second hydraulic governors driven by said driven shaft and providing a fluid pressure that varies in accordance with the speed of the driven shaft, said first governor being connected with said first shift valve and said first governor being connected with said second shift valve, and means for connecting said second governor with said first valve and controlled by said second valve to provide such connection only when said second valve has been shifted by said second governor to its high-speed ratio position.

24. In a transmission, the combination of a drive shaft, a driven shaft, a pair of change-speed units connected in tandem between said shafts, each of said units providing a low and a high speed ratio and including a friction engaging means for completing the high speed ratio, a fluid pressure motor for engaging each of said engaging means, a source of fluid pressure adapted to be connected to said motors, a first shiftable valve effectively between said fluid pressure source and said change-speed unit and a second shiftable valve effectively between said fluid source and said second change-speed unit, each of said valves having low and high speed positions in the latter of which the valves are effective to connect said fluid source with said respective fluid motor, hydraulic governor means for controlling the shifting of said shiftable valves and driven by said driven shaft, said governor means including first and second governors providing a fluid pressure that varies with the speed of said driven shaft, said first governor being connected with said first valve for shifting the valve and said second governor being connected with said second valve for shifting the latter valve, and means for effectively connecting said second governor with said first valve and controlled by said second valve whereby the fluid pressure from said second governor is effective to shift said first shiftable valve to its high speed position after said second shiftable valve has previously been shifted by said governor pressure to its high speed position.

25. In a transmission, the combination of a drive shaft, a driven shaft, means providing a plurality of speed ratios between said shafts, hydraulic means for shifting the transmission between its various speed ratios and including a shiftable valve having a position corresponding to each of the speed ratios, hydraulic governor means driven by one of said shafts and applying a fluid pressure that varies in accordance with the speed of the shaft to said shiftable valve for shifting the valve from a lower speed ratio position to a higher speed ratio position, and hydraulic means exclusive of said governor means for yieldably holding said shiftable valve in its higher speed ratio position and including unbalanced areas on said shiftable valve to which fluid under pressure is applied in the high speed ratio position of the valve.

26. In a transmission, the combination of a drive shaft, a driven shaft, gearing for providing a plurality of speed ratios between said shafts and including a friction engaging means for completing a high speed ratio between the shafts, a fluid pressure responsive motor for engaging said engaging means, a source of fluid pressure, means for shifting the transmission between its various speed ratios and including a shiftable valve having a position corresponding to each of the speed ratios and in a high speed ratio position connecting said fluid pressure source and said fluid motor, hydraulic governor means driven by said driven shaft and applying a fluid pressure to said shiftable valve which fluid pressure varies in accordance with the speed of the driven shaft for shifting the valve from a low ratio position to said high ratio position, and means exclusive of said governor means for yieldingly holding said shiftable valve in its high ratio position and including unbalanced areas on the valve which are exposed to the fluid pressure being applied by the valve to said fluid pressure motor.

27. In a transmission, the combination of a drive shaft, a driven shaft, gearing providing a low and a high speed ratio between said shafts and including a friction engaging means which is engaged to complete the high speed ratio, a fluid pressure motor for engaging said friction engaging means, a source of fluid pressure, means for shifting the transmission between its low and high speed ratios and including a shiftable valve having a position corresponding to each of said speed ratios, said shiftable valve in its high speed ratio position effectively connecting said pressure source with said fluid motor, hydraulic governor means driven by said driven shaft for applying a fluid pressure on said shiftable valve tending to shift the valve from its low ratio position to its high ratio position which pressure varies in accordance with the speed of said driven shaft, a spring acting on said shiftable valve and tending to shift the valve from its high ratio position to its low ratio position, and means exclusive of said governor means for yieldably holding said shiftable valve in its high ratio position and including unbalanced areas on said valve which are in communication with said motor when the valve is in its high ratio position whereby the valve remains in its high ratio position until the speed of the driven shaft drops below the speed at which said governor means are effective to shift the valve into its high ratio position.

28. In a transmission, the combination of a drive shaft, a driven shaft, means providing a plurality of power trains of different speed ratio between said shafts, a shiftable member for shifting said last-named means between its various speed ratios, a governor driven in accordance with the speed of one of said shafts effective to apply a force on said shiftable member for shifting the member, and a selectively operable member for controlling the force applied by said governor and effective to reduce the force applied by said governor on said shiftable member by a predetermined amount and to maintain this predetermined amount of reduction regardless of the speed of said one shaft for thereby increasing the speeds of said last-named shaft at which the shiftable member is shifted.

29. In a transmission for an automotive vehicle, the combination of a drive shaft, a driven shaft, means for providing a plurality of power trains of different speed ratio between said shafts, means for shifting the transmission between its various speed ratios and including a shiftable member having a position corresponding to each of the speed ratios, a governor responsive to the speed of said driven shaft and arranged to apply a force on said shiftable member tending to shift it which varies in accordance with the speed of the driven shaft, an accelerator for the vehicle, and means for reducing the force applied by said governor means on said shiftable member by a predetermined amount and for maintaining this predetermined amount of reduction regardless of the speed of said driven shaft thereby increasing the speed of the driven shaft at which the shiftable member is shifted to provide an increase in speed ratio in the transmission, said last-named means being under the control of said accelerator for so reducing the pressure applied to the shiftable member when the accelerator is moved to an open throttle position.

30. In a transmission, the combination of a drive shaft, a driven shaft, means providing a plurality of power trains of different speed ratio between said shafts, means for shifting the transmission between its various speed ratios and including a shiftable member having a position corresponding to each of the different speed ratios, hydraulic governor means driven by said driven shaft for applying a fluid pressure to said shiftable member for shifting the member with the fluid pressure varying with the speed of the driven shaft, and selectively operable means for reducing by a predetermined amount the fluid pressure applied by said governor means on said shiftable member and for maintaining this predetermined amount of reduction regardless of the speed of said driven shaft thereby increasing the speeds of the driven shaft at which the shift member is moved to increase the speed ratio through the transmission.

31. In a transmission, the combination of a drive shaft, a driven shaft, means providing a plurality of power trains of different speed ratio between said shafts, means for shifting the transmission between its various speed ratios and including a shiftable valve having a position corresponding to each of the speed ratios, hydraulic governor means driven by said driven shaft for applying a fluid pressure on said valve which varies in accordance with the speed of the driven shaft for shifting the valve to a higher speed ratio position, spring means for opposing such movement of said shiftable valve, and valve means under the control of said accelerator for reducing by substantially a predetermined amount the fluid pressure from said governor means applied on said shiftable valve and for maintaining this predetermined amount of reduction regardless of the speed of said driven shaft when the accelerator is moved to an open throttle kickdown position thereby increasing the speeds of the driven shaft at which the valve is shifted to provide a power train of increased speed ratio.

32. In a transmission, the combination of a drive shaft, a driven shaft, means for providing a plurality of power trains of different speed ratio between said shafts, means for shifting the transmission between its various speed ratios and including a shiftable member, governor means driven in accordance with the speed of one of said shafts for exerting a force on said shiftable member for shifting the member to a higher speed ratio position, and means selectively operable for maintaining the force exerted by said governor means at a predetermined maximum value less than the force necessary to move said shiftable member to its high speed ratio position thereby inhibiting movement of the shiftable member to its high speed ratio position.

33. In a transmission for an automotive vehicle, the combination of a drive shaft, a driven shaft, means for providing a plurality of power trains of different speed ratio between said shafts and including a high speed ratio and a low speed ratio, means for shifting the transmission between its various speed ratios and including a shiftable member having a position corresponding to each of the speed ratios, governor means driven by said driven shaft and effective to exert a force on the shiftable member which varies with the speed of the driven shaft, an accelerator for the vehicle, and means under the control of the accelerator for maintaining the force applicable by said governor means on said shiftable member at a certain maximum value less than the force necessary to move said shiftable member to its high speed ratio position when the accelerator is moved to an open throttle kickdown position thereby inhibiting said shiftable member from being moved into its position corresponding to said high speed ratio and preventing operation of the transmission in said high speed ratio.

34. In a transmission, the combination of a drive shaft, a driven shaft, means providing a plurality of power trains of different speed ratio between said shafts and including a high speed ratio power train, means for shifting the transmission between said speed ratios and including a shiftable member having a position corresponding to each of the speed ratios, hydraulic governor means driven by one of said shafts and effective to apply a pressure on said shiftable member tending to shift the member toward its higher speed positions which pressure varies according to the speed of the driven shaft, and means for selectively maintain the pressure applied by said hydraulic governor means on said shiftable member at a predetermined maximum value less than the pressure necessary to move said shiftable member to its high speed ratio position which inhibits the shiftable member from being moved to its high speed ratio position.

35. In a transmission, the combination of a drive shaft, a driven shaft, means providing a plurality of power trains of different speed ratio between said shafts, hydraulic means for shifting the transmission and including a shiftable valve having a position corresponding to each of the speed ratios, hydraulic governor means driven by said driven shaft and applying a force on said shiftable valve for shifting the valve from a low speed ratio position to a high speed ratio position which force varies in accordance with the speed of the driven shaft, spring means for opposing such movement of the shiftable valve, and valve means under the control of the accelerator for maintaining the fluid pressure applied by said governor means on said shiftable valve at a predetermined maximum value less than the pressure necessary to move said shiftable valve to its high speed ratio position which inhibits the shiftable valve from being moved by the governor pressure to the high speed ratio position of the valve.

36. In a transmission, the combination of a drive shaft, a driven shaft, means for providing a power train between said shafts and including an engaging means for completing the power train when engaged, said engaging means being capable of gradual engagement, speed-responsive means responsive to the rotation of one of said shafts for causing a gradual engagement of said engaging means and a complete engagement thereof on the speed of the one shaft reaching a predetermined value, and selectively operable means operatively associated with said engaging means for more gradually engaging the engaging means by delaying the engagement of said engaging means until the speed of said one shaft is greater than said predetermined value.

37. In a transmission for an automotive vehicle having a steering wheel, the combination of a drive shaft, a driven shaft, means for providing forward and reverse power trains between said shafts each of which includes a friction engaging means for completing the power train when engaged, a fluid pressure motor for operating each of said engaging means, a source of fluid pressure adapted to be connected to either of said motors, means responsive to the speed of said drive shaft for regulating the pressure applied from said fluid source to either of said motors for increasing the pressure as the shaft speed increases, and a valve for effectively connecting said pressure source with either of said engaging means and actuated by means of a lever disposed immediately beneath the steering wheel of the vehicle, said valve and lever having neutral and forward and reverse drive positions, said valve being formed with bleeder passages therein which drain a portion of the fluid applied to either of said motors when the valve is shifted midway between its neutral position and either its forward or reverse positions.

38. In a transmission, the combination of a drive shaft, a driven shaft, means for providing forward and reverse power trains between said shafts and each comprising a friction engaging means which when engaged completes the respective power train, speed responsive means for controlling the engagement of either of said engaging means whereby for engaging either of the engaging means at predetermined speeds of said drive shaft, and means for selectively rendering either of said power trains operative and including a control member having a neutral and forward and reverse positions, and means for modifying the action of said speed responsive means and being under the control of said member whereby when the member is shifted midway between its neutral and either its forward or reverse positions it causes the respective friction engaging means to be engaged at a higher speed of said drive shaft.

39. In a transmission, the combination of a drive shaft, a driven shaft, means for providing a power train between said shafts and including an engaging means for completing the power train when engaged, a fluid pressure motor for engaging said engaging means, a source of fluid pressure adapted to be connected to said motor for engaging the engaging means and comprising a pump driven by said drive shaft, a second source of fluid pressure adapted to be connected to said motor and comprising a pump driven by said driven shaft, means comprising a speed responsive valve for regulating the pressure from said first-named fluid source and applied to said motor according to the speed of said drive shaft when said driven shaft is inoperative, and a valve for selectively rendering said speed responsive valve ineffective whereby said driven shaft pump may be utilized for engaging said engaging means when said drive shaft pump is not operative.

40. In a transmission, the combination of a drive shaft, a driven shaft, means for providing a power train between said shafts and including a friction engaging means which when engaged completes the power train, a fluid pressure motor for engaging said engaging means a source of fluid pressure including a pump driven by said drive shaft and adapted to be connected with said motor, a centrifugal valve operated by said drive shaft and effective to regulate the fluid pressure applied to said pressure motor for regulating the engagement of said engaging means, a pump driven by said driven shaft and also effective for supplying fluid under pressure to engage said engaging means, and a selectively operable valve in series with said centrifugal valve for preventing escape of fluid through the centrifugal valve whereby said pump driven by the driven shaft may be solely operable to engage said engaging means when said drive shaft is inoperative.

41. In a transmission, the combination of a drive shaft, a driven shaft, means for providing a power train between said shafts and including a friction engaging means for completing the power train when engaged, a fluid motor for engaging said engaging means, a source of fluid pressure adapted to be connected to said motor, means for regulating the fluid pressure applied to said motor to increase with the speed of said drive shaft and having a fluid discharge therefrom, and means for directing the fluid discharged from said last-named means on to the friction surfaces of said engaging means for cooling the engaging means.

42. In a transmission, the combination of a drive shaft, a driven shaft, means for providing a power train between said shafts and including a friction brake for completing the power train when engaged, a fluid pressure motor for engaging said friction brake, a source of fluid pressure adapted to be connected with said motor, means for regulating the fluid pressure from said source and applied to said motor to increase the pressure and thereby increase the engagement of said brake as the drive shaft increases in speed, said last-named means having a fluid discharge, said brake comprising a brake band having grooves in its internal surface, and means for connecting the discharge from said last-named means with the grooves in said brake band for cooling the brake.

43. In a transmission, the combination of a drive shaft, a driven shaft, means for providing a power train between said shafts and including a friction engaging means for completing the power train when engaged, a fluid pressure responsive motor for engaging said friction engaging means, a source of fluid pressure adapted to be connected to said motor, means for regulating the pressure of fluid applied to said motor in accordance with the speed of said drive shaft to increase the fluid pressure as the drive shaft speed increases and including a centrifugal valve mechanism driven by the drive shaft, said valve mechanism having a fluid discharge, and means for directing the discharge of said valve mechanism on to the friction surfaces of said friction engaging means for cooling the surfaces.

44. In a transmission, the combination of a drive shaft, a driven shaft, means for providing a power train between said shafts and including a friction brake for completing the power train when engaged, a fluid pressure motor for engaging said friction brake, a source of fluid pressure adapted to be connected to said motor, means for regulating the fluid pressure applied to said motor in accordance with the speed of said drive shaft for increasing the pressure as the drive shaft speed increases and including a centrifugal valve having a fluid discharge, said brake comprising a brake drum and a brake band fitting about said drum, said band being provided with circumferential grooves in its inner surface, means forming a fluid trough at the ends of said band in communication with said grooves, and means for connecting the discharge of said centrifugal valve mechanism with said trough for supplying fluid to said grooves for cooling the brake.

45. In a transmission, the combination of a drive shaft, a driven shaft, means for providing a power train between said shafts and including a friction brake for completing the power train when engaged, and means for engaging said friction brake in accordance with the speed of said drive shaft and including a fluid pressure motor for engaging the brake, a pump driven by said drive shaft and connected with said motor, and means providing an orifice for relieving the fluid pressure on said fluid motor and establishing a pressure in said fluid motor which increases with an increase in the speed of said drive shaft.

46. In a transmission, the combination of a drive shaft, a driven shaft, means providing a power train between said shafts and including a friction brake for completing the power train when engaged, and means for engaging said brake in accordance with the speed of said drive shaft and including a fluid pressure motor for engaging the brake, a pump driven by said drive shaft and connected to apply pressure to said motor, and means providing a sharp edge orifice also connected with said pump for bypassing the output of the pump and establishing a pressure in said fluid motor which increases with an increase in the speed of said drive shaft.

47. In a transmission for an automotive vehicle having a driving engine with an intake manifold the pressure in which varies with the torque transmitted by the engine, the combination of a drive shaft adapted to be driven by the engine, a driven shaft, means for providing power trains between said shafts of different speed ratios and each power train including a fluid pressure operated friction engaging means for completing the train, a fluid reservoir, a pump driven by said drive shaft and connected to draw fluid from said reservoir and constituting a pressure source selectively connectible with said friction engaging means for engaging said latter means, means defining a fixed size orifice connected with said pump and bleeding off the fluid discharged by the orifice into said reservoir for thereby relieving the fluid pressure output of the pump and causing the pressure discharged by the pump to increase according to the drive shaft speed at low speeds of the drive shaft for initially engaging one of said engaging means for a low speed drive in accordance with the speed of said drive shaft at low speeds of the shaft, and a pressure responsive valve connected with the intake manifold of the driving engine so as to be responsive to pressures therein for relieving the fluid pressure discharged by said pump for providing an engine torque responsive engagement of the other friction engaging means for a higher speed ratio drive between said shafts.

48. In a transmission for an automotive vehicle having a driving engine with an intake manifold the vacuum in which varies with the torque transmitted by the engine, the combination of a drive shaft adapted to be connected with the engine, a driven shaft, means for providing power trains between said shafts of different speed ratios and each power train including a fluid pressure operated friction engaging means for completing the train, a common fluid pressure source for said friction engaging means including a pump driven by said drive shaft and drawing fluid from a reservoir, means for controlling the pressure of said source in accordance with the speed of said drive shaft for engaging one of said engaging means accordingly and including a fluid flow restricting means hydraulically connected with the output of the pump and discharging fluid into the reservoir, and a valve controlled in accordance with the vacuum in the manifold of the driving engine and connected in parallel with said fluid flow restricting means for thereby controlling the fluid pressure of said source in accordance with the pressure in the manifold and thereby according to engine torque at higher speeds of the drive shaft for providing an engine torque responsive engaging of the other friction engaging means for a higher speed ratio.

49. In a transmission for an automotive vehicle having a driving engine with an intake manifold the pressure in which varies with the torque transmitted by the engine, the combination of a drive shaft, a driven shaft, means for providing a plurality of power trains of different speed ratios between said shafts, means for changing the transmission between its various speed ratios and including fluid pressure engaged engaging means completing the various speed ratios and a control member having a position corresponding to each of the speed ratios and shiftable between its positions to cause the speed ratio changes, a source of fluid pressure, means for applying said fluid pressure to said control member for shifting the member from one of its said positions to another, and means to apply pressure from said source to a different one of said engaging means when said control member is shifted, and means connected with said intake manifold for regulating the pressure of said fluid source applied to said control member for shifting it between its various positions, and for varying the torque transmitting capacity of the engaging means in accordance with the pressure within said manifold.

50. In a transmission for an automotive vehicle having a driving engine with an intake manifold the pressure in which varies with the torque transmitted by the engine, the combination of a drive shaft, a driven shaft, means for providing power trains of different speed ratios between said shafts, means for changing the transmission between its various speed ratios and including a shiftable control member having a position corresponding to each of the speed ratios, a source of fluid pressure including a pump adapted to be connected to said shiftable control member for shifting the control member in one direction, means for regulating the pressure of the fluid from said pump and applied to said shiftable control member in accordance with the manifold pressure and including a regulating valve connected with said manifold and controlled by the pressure therein, and governing means driven by said driven shaft for applying a force to said shiftable control member tending to shift the control member in the opposite direction which force varies in accordance with the speed of the driven shaft.

51. In a transmission for an automotive vehicle having a driving engine with an intake manifold the vacuum in which varies with the torque transmitted by the engine, the combination of a drive shaft, a driven shaft, means for providing a power train between said shafts and including a friction engaging means for completing the power train when engaged, means connected with said manifold and responsive to changes in vacuum in the manifold for applying an engaging pressure to said engaging means that varies according to changes in vacuum in the manifold, said last-named means including a pressure responsive motor connected with the manifold and responsive to changes in vacuum in the intake manifold, and means for limiting the effectiveness of said means on said engaging pressure so that the highest values of vacuum in said intake manifold above a predetermined value are ineffective to change the engaging pressure supplied by said means so that the engaging pressure is maintained at least at a minimum predetermined value.

52. In a transmission for an automotive vehicle having a driving engine with an accelerator and with an intake manifold the pressure in which varies with the torque transmitted by the engine, the combination of a drive shaft, a driven shaft, means for providing a power train between said shafts and including a friction engaging means for completing the power train when engaged, means connected with said manifold and responsive to the pressure in the manifold for engaging said engaging means and for applying an engaging pressure which varies according to the pressure in the manifold, said last-named means including a source of pressure and a regulating valve for regulating the pressure of the source and a pressure responsive diaphragm effective on said regulating valve and connected with the manifold of the driving engine, and means for limiting the effectiveness of the manifold vacuum with respect to said valve so that higher values of vacuum in said intake manifold above a predetermined value and corresponding to closed throttle positions of the vehicle accelerator are ineffective on the valve and cause no changes in the engaging pressure of said friction engaging means for thereby limiting the engaging pressure on said friction engaging means to at least a minimum value.

53. In a transmission for an automotive vehicle having a driving engine, the combination of a drive shaft, a driven shaft, means for providing a power train between said shafts and including a fluid pressure engaged friction engaging means for completing the power train when engaged, a pump supplying fluid under a predetermined pressure to a fluid pressure line, valve means for connecting said friction engaging means and said pump pressure line for maintaining said friction engaging means under said predetermined pressure to maintain the engaging means engaged for completing the power train, and means under the control of said valve means and acting directly on said fluid pressure line for temporarily decreasing the pump output pressure when said valve means is moved to connect said friction engaging means and said pump.

54. In a transmission for an automotive vehicle having a driving engine, the combination of a drive shaft, a driven shaft, means for providing a power train between said shafts and including a friction engaging means for completing the power train when engaged, a fluid pressure responsive motor for engaging said friction engaging means, a pump supplying fluid under a predetermined pressure to a fluid pressure line, a valve for connecting said pump pressure line and said motor for maintaining said predetermined pressure applied to said motor for maintaining said engaging means engaged, and means under the control of said valve and acting directly on said fluid pressure line for temporarily decreasing the pump output pressure when the valve is moved to connect said pump and said motor for reducing the initial applied force of said engaging means to provide an initial slip of the engaging means.

55. In a transmission for an automotive vehicle having a driving engine, the combination of a drive shaft, a driven shaft, means for providing a power train between said shafts and including a friction engaging means for completing the power train when engaged, a fluid pressure responsive motor for engaging said friction engaging means, a source of fluid under pressure, a regulator valve for maintaining said source at a predetermined pressure, a selector valve having a first position in which it connects said pressure source and said motor for maintaining said predetermined pressure applied to said motor for maintaining said engaging means engaged and having a second position in which it disconnects said pressure source and motor, and means under the control of said selector valve for applying a force on said regulator valve during movement of the selector valve between its said second and first positions for temporarily decreasing the pressure of said source as applied to said selector valve and said motor giving the engaging means an initial slip.

56. In a transmission for an automotive vehicle having a driving engine, the combination of a drive shaft, a driven shaft, means for providing a power train between said shafts and including a friction engaging means for completing the power train when engaged, a fluid pressure responsive motor for engaging said engaging means, a source of fluid pressure adapted to be connected with said motor, a regulating valve for regulating the fluid pressure of said source to a predetermined value, a piston adapted to be effective on said regulating valve, a selector valve having a first position in which it connects said pressure source with said motor for applying said predetermined pressure on said motor and maintaining the engaging means engaged and having a second position in which it disconnects said pressure source and motor, and conduit means controlled by said selector valve for connecting said source and said piston temporarily at an intermediate position of said selector valve between its said second and first positions for applying the pressure of said source on said piston and for thereby decreasing the pressure of the source applied to said motor for causing the engaging means to become engaged at a lower fluid pressure and with an initial slip as said selector valve is moved from its said second position to its said first position.

57. In a transmission for an automotive vehicle having a driving engine, the combination of a drive shaft, a driven shaft, means for providing a plurality of power trains between said shafts each including a friction engaging means for completing the power train when engaged, a source of power for providing a pressure for both of said engaging means for engaging both of said engaging means, means for changing the transmission from one speed ratio to another speed ratio by engaging one of said engaging means and disengaging the other and including a control member having a first position corresponding to one of said speed ratios and a second position corresponding to the other of said speed ratios, and means under the control of said control member for temporarily reducing the potential of said power source when said control member is moved from its first position to its second position for reducing temporarily the pressure of engagement of the friction engaging means being engaged.

58. In a transmission for an automotive vehicle having a driving engine with a fuel intake manifold the pressure in which varies with the torque transmitted by the engine, the combination of a drive shaft, a driven shaft, means for providing a plurality of power trains between said shafts each including a friction engaging means for completing the power train when engaged, a fluid pressure motor for engaging each of said engaging means, a source of fluid pressure connectible with said motors, a regulating valve connected with said manifold so as to be operated by the pressure therein for regulating the pressure of said source, a selector valve for changing the transmission from one of its speed ratios to the other of its speed ratios by applying fluid pressure to one of said motors from said source while draining the other motor of fluid under pressure, and means controlled by said selector valve for applying a fluid pressure on said regulating valve during the movement of said selector valve between its positions for temporarily reducing the pressure of said pressure source for allowing an initial slip of the engaging means being engaged on a change in the speed ratio of the transmission.

59. In a transmission, the combination of a drive shaft, a driven shaft, means for providing a power train between said shafts which includes a friction engaging means for completing the power train when engaged, a fluid pressure motor for operating said engaging means, a source of fluid pressure adapted to be connected to said motor, means responsive to the speed of one of said shafts for regulating the pressure applied from said fluid source to said motor for increasing the pressure as the shaft speed increases, and a valve for effectively connecting said pressure source with said engaging means and having a neutral position for breaking said connection and an active position for making said connection, said valve being formed with a bleeder passage therein which drains a portion of the fluid directed to said motor when the valve is shifted to a position between its said neutral and active positions.

References Cited in the file of this patent

UNITED STATES PATENTS

| Number | Name | Date |
|---|---|---|
| 1,271,163 | Hartford | July 2, 1918 |
| 1,393,870 | Wilson | Oct. 18, 1921 |
| 1,418,537 | Cotal | June 6, 1922 |
| 1,498,877 | Knee et al. | June 24, 1924 |
| 1,658,021 | Smith | Jan. 31, 1928 |
| 1,802,630 | Cotal | Apr. 28, 1931 |
| 1,839,145 | Forichon | Dec. 29, 1931 |
| 1,842,978 | Raven | Jan. 26, 1932 |
| 1,980,797 | Hale | Nov. 13, 1934 |
| 2,135,246 | Yoxall | Jan. 1, 1938 |
| 2,135,908 | Millican | Nov. 8, 1938 |
| 2,151,714 | Paresi | Mar. 28, 1939 |
| 2,193,305 | Thompson | Mar. 12, 1940 |
| 2,193,524 | Thompson | Mar. 12, 1940 |
| 2,204,872 | Thompson | June 18, 1940 |
| 2,212,740 | Iavelli | Aug. 27, 1940 |
| 2,225,315 | McCollum | Dec. 17, 1940 |
| 2,226,014 | Patterson | Dec. 24, 1940 |
| 2,229,336 | Neracher | Jan. 21, 1941 |
| 2,229,345 | Schotz | Jan. 21, 1941 |
| 2,232,797 | Neracher | Feb. 25, 1941 |
| 2,282,949 | Dolza | May 12, 1942 |
| 2,310,518 | Dolza | Feb. 9, 1943 |
| 2,332,593 | Nutt et al. | Oct. 26, 1943 |
| 2,343,955 | Cotterman | Mar. 14, 1944 |
| 2,402,248 | Hale | June 18, 1946 |
| 2,402,382 | Dodge | June 18, 1946 |
| 2,409,975 | Curtis | Oct. 22, 1946 |
| 2,446,730 | Wemp | Aug. 10, 1948 |
| 2,495,515 | Foley | Jan. 24, 1950 |
| 2,516,208 | Hasbany | July 25, 1950 |

(Other references on following page)

UNITED STATES PATENTS

| | | |
|---|---|---|
| 2,528,584 | Farkas | Oct. 7, 1950 |
| 2,528,585 | Farkas et al. | Nov. 7, 1950 |
| 2,564,466 | Clifton | Aug. 14, 1951 |
| 2,575,522 | McFarland | Nov. 20, 1951 |
| 2,576,336 | Farkas | Nov. 27, 1951 |
| 2,584,965 | McFarland | Feb. 5, 1952 |
| 2,595,969 | McFarland | May 6, 1952 |
| 2,627,189 | McFarland | Feb. 3, 1953 |
| 2,633,760 | Kelley | Apr. 7, 1953 |

FOREIGN PATENTS

| | | |
|---|---|---|
| 602,803 | Great Britain | June 3, 1948 |
| 432,981 | Great Britain | Aug. 7, 1935 |
| 479,408 | Great Britain | Feb. 4, 1938 |
| 924,557 | France | Aug. 8, 1947 |
| 553,497 | France | Feb. 12, 1923 |

OTHER REFERENCES

Pub., The Gasoline Automobile, P. M. Heldt, Nyack, New York; 4th ed., vol. II, pages 69 and 125.